(12) United States Patent
Hayakawa

(10) Patent No.: US 8,300,321 B2
(45) Date of Patent: Oct. 30, 2012

(54) ZOOM LENS SYSTEM

(75) Inventor: Koichiro Hayakawa, Saitama (JP)

(73) Assignee: Hoya Corporation, Tokyo (JP)

( * ) Notice: Subject to any disclaimer, the term of this patent is extended or adjusted under 35 U.S.C. 154(b) by 148 days.

(21) Appl. No.: 12/979,453

(22) Filed: Dec. 28, 2010

(65) Prior Publication Data
US 2011/0211264 A1 Sep. 1, 2011

(30) Foreign Application Priority Data

Feb. 26, 2010 (JP) ................................ 2010-041487
Oct. 19, 2010 (JP) ................................ 2010-234411

(51) Int. Cl.
*G02B 15/14* (2006.01)

(52) U.S. Cl. ....................................................... 359/689

(58) Field of Classification Search .................... 359/689
See application file for complete search history.

(56) References Cited

U.S. PATENT DOCUMENTS

| 7,486,448 | B2 * | 2/2009 | Iwama | ........................... 359/689 |
| 2005/0057817 | A1 | 3/2005 | Ori | |
| 2009/0091843 | A1 | 4/2009 | Ohata | |
| 2009/0257132 | A1 | 10/2009 | Hayakawa et al. | |

FOREIGN PATENT DOCUMENTS

| JP | 2005-084597 | 3/2005 |
| JP | 2009-092740 | 4/2009 |

* cited by examiner

*Primary Examiner* — William Choi
(74) *Attorney, Agent, or Firm* — Greenblum & Bernstein, P.L.C.

(57) ABSTRACT

A zoom lens system includes a negative first lens group, a positive second lens group, and a positive third lens group. The second lens group includes a positive lens element, and two negative lens elements. The following conditions (1) and (2) are satisfied:

$$2.0 < |VD1t - VD1w|/(ft/fw) < 3.4 \qquad (1),$$

and $$0.89 < |m2w/m3w| \qquad (2),$$

wherein VD1$t$ and VD1$w$ designate the distances, at the long and short focal length extremities, from the image-side surface of the lens element provided closest to the image side within the first lens group to the object-side surface of the positive lens element provided closest to the object side within the second lens group; f$t$ and f$w$ designate the entire focal length of the zoom lens system at the long and short focal length extremities; and m2$w$ and m3$w$ designate the lateral magnification of the second and third lens groups at the short focal length extremity when focused on an object at infinity.

5 Claims, 31 Drawing Sheets

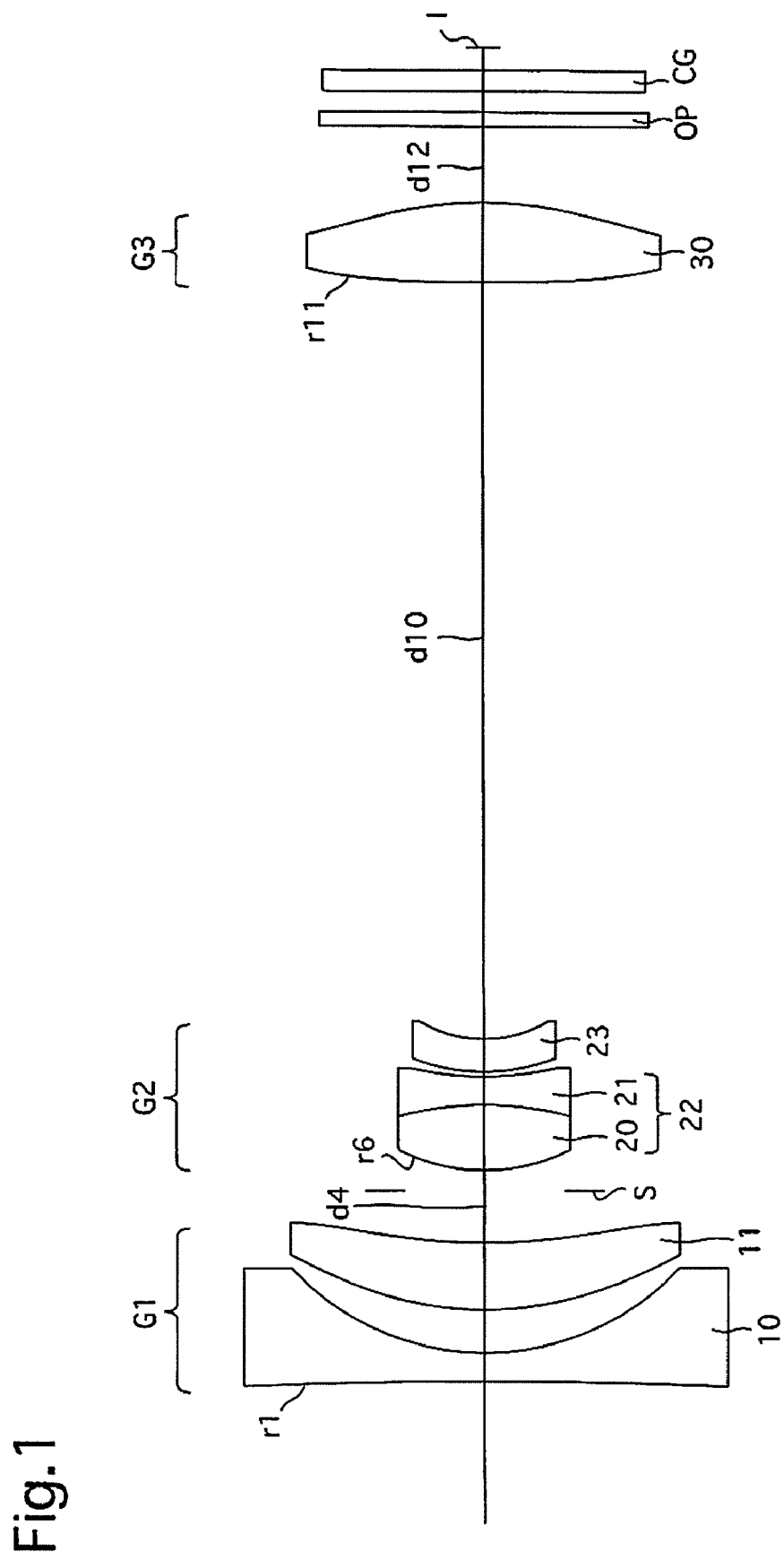

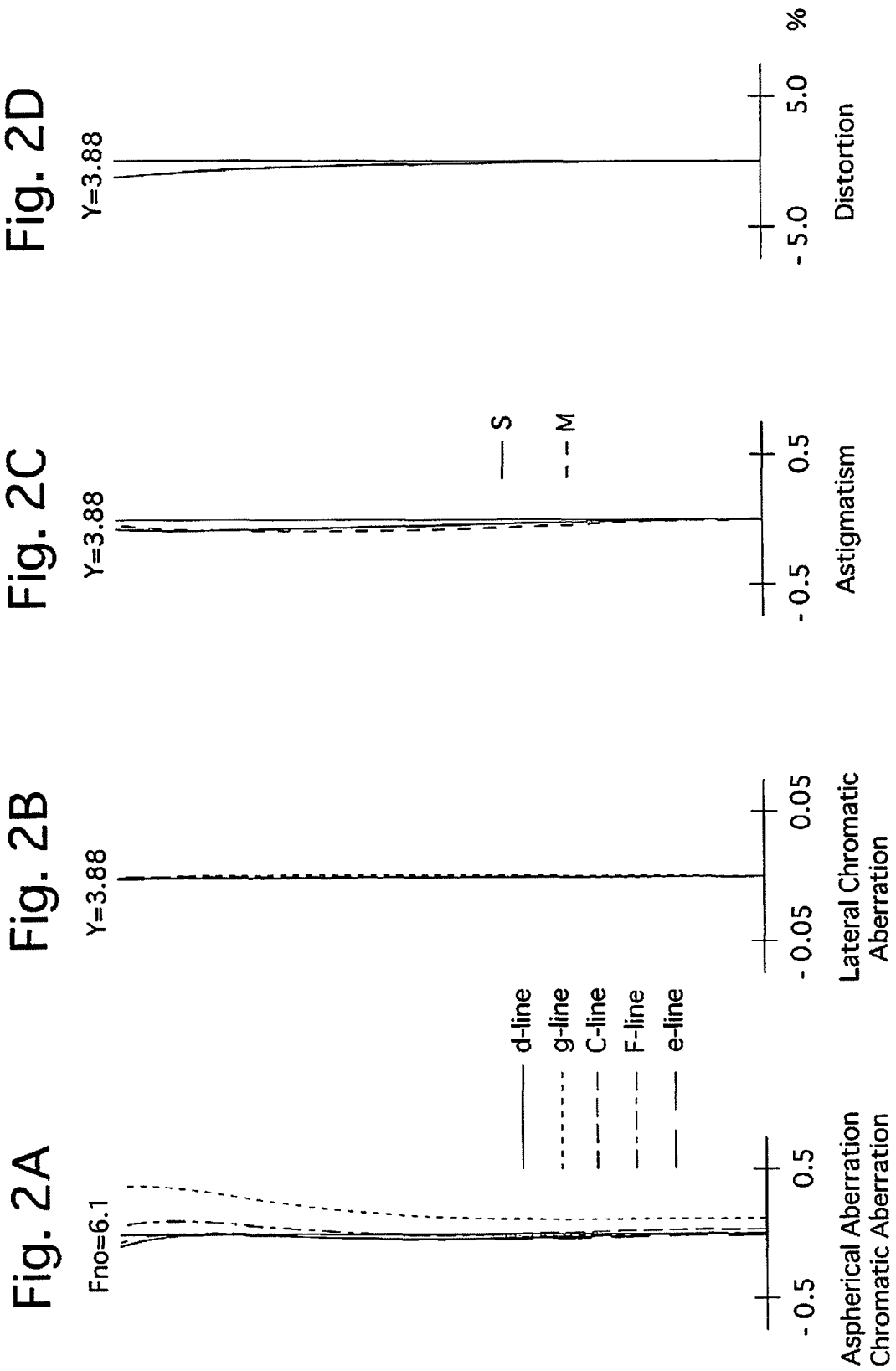

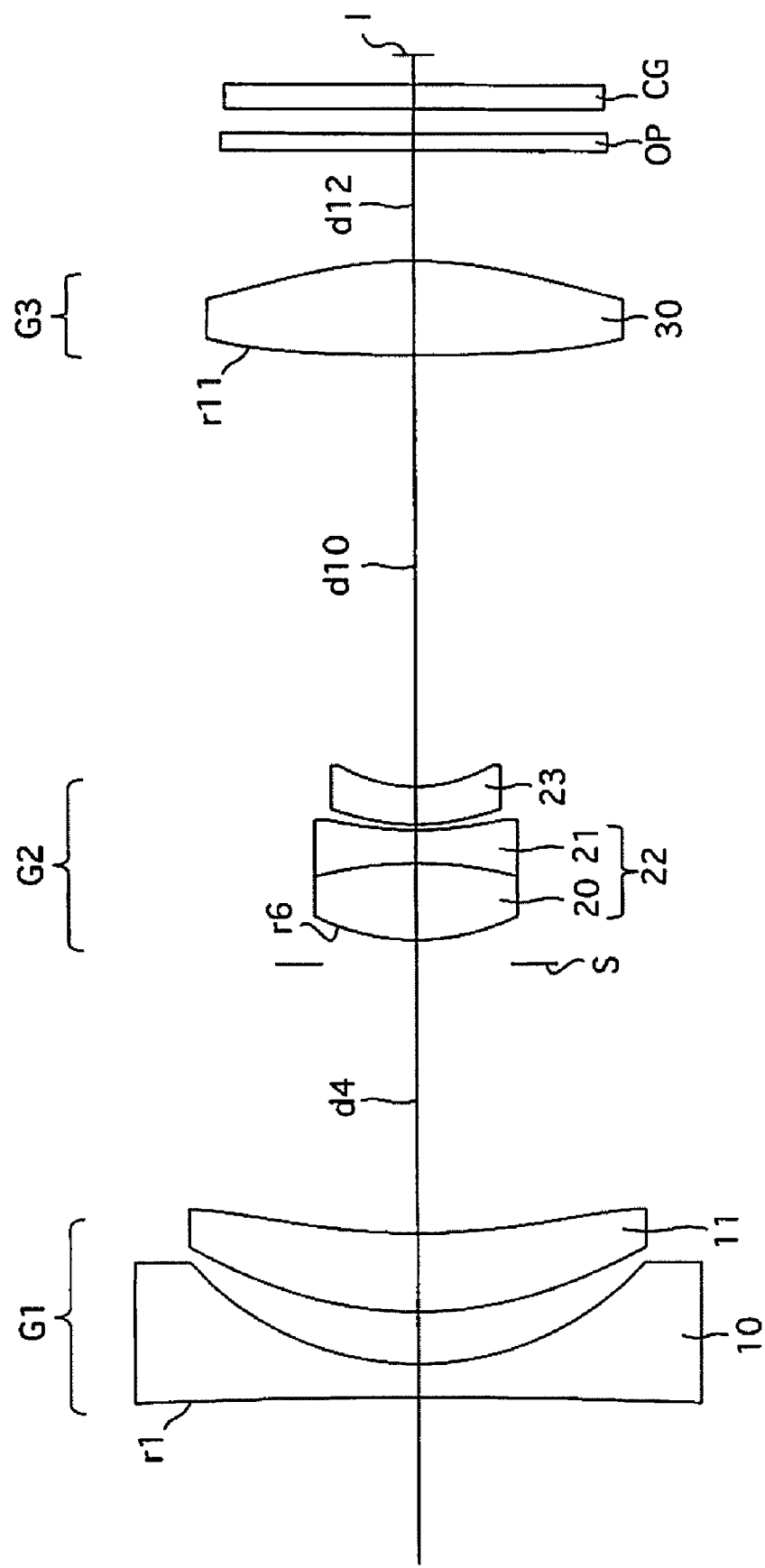

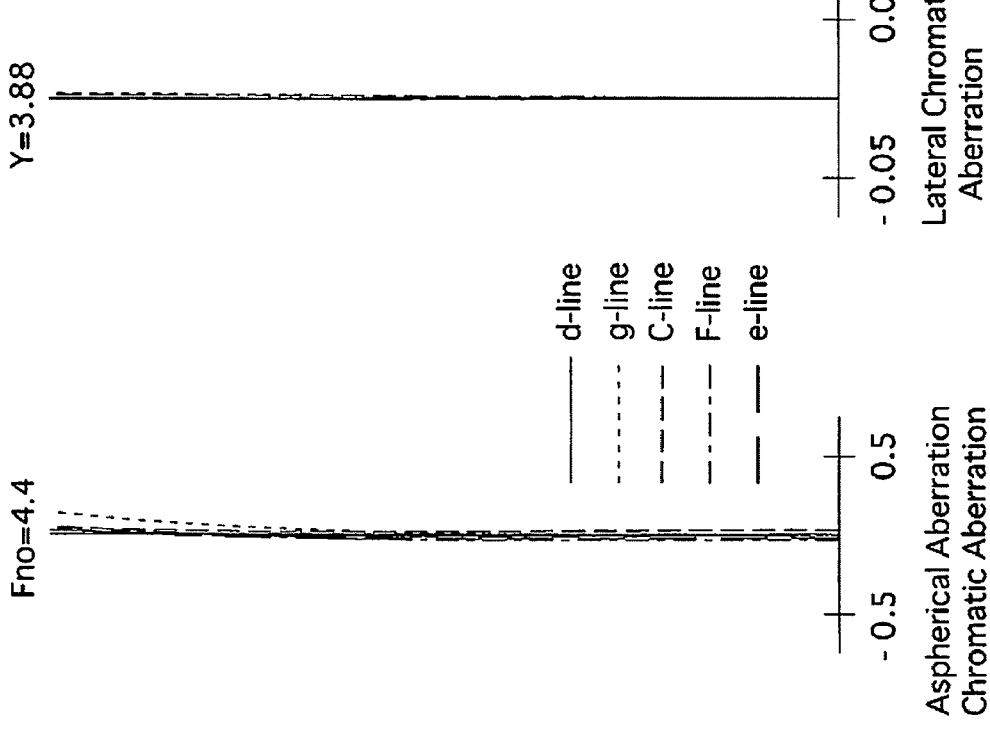

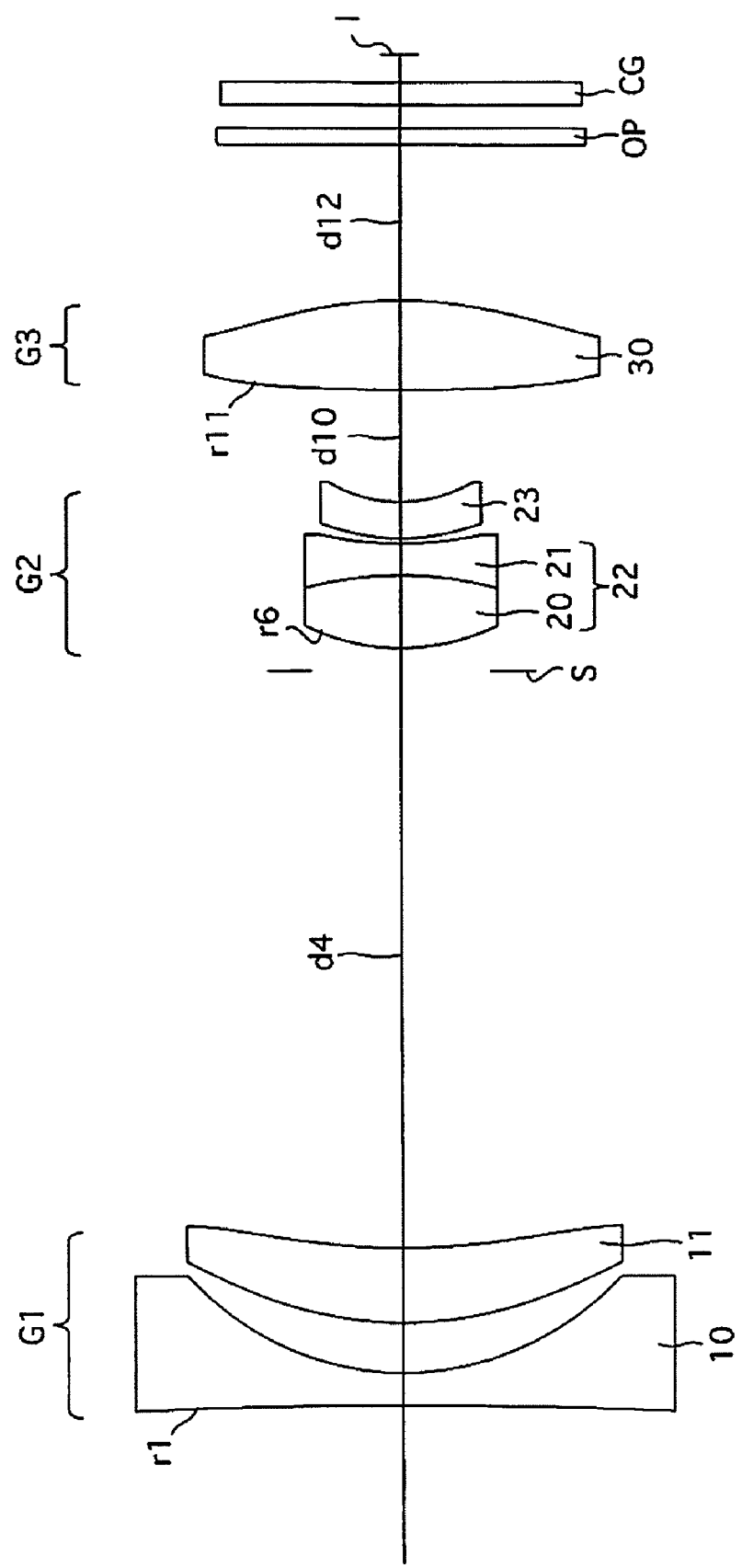

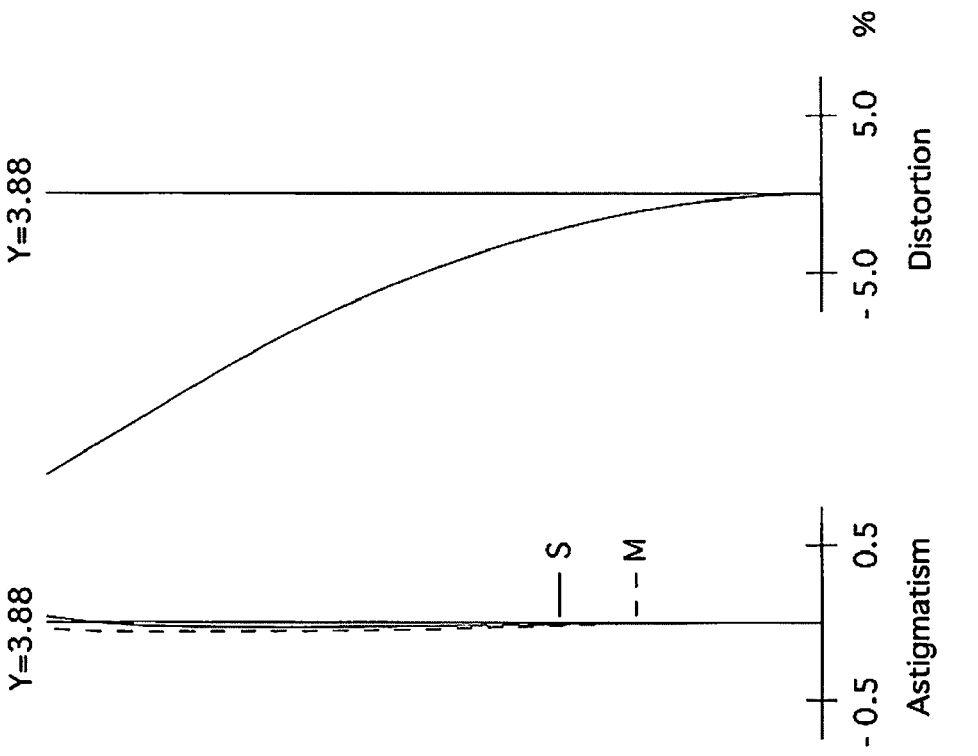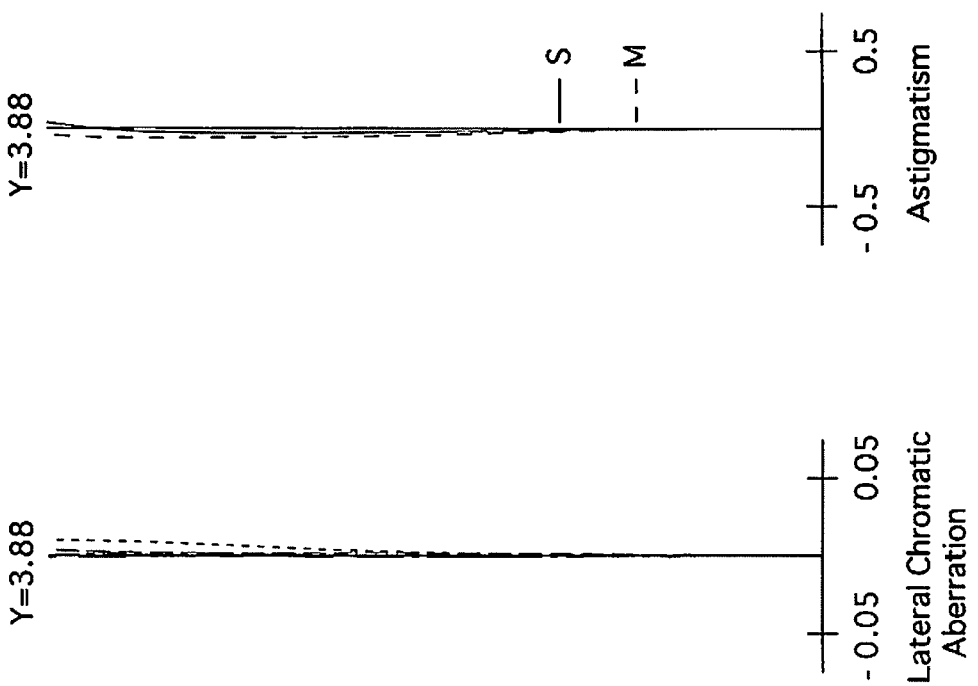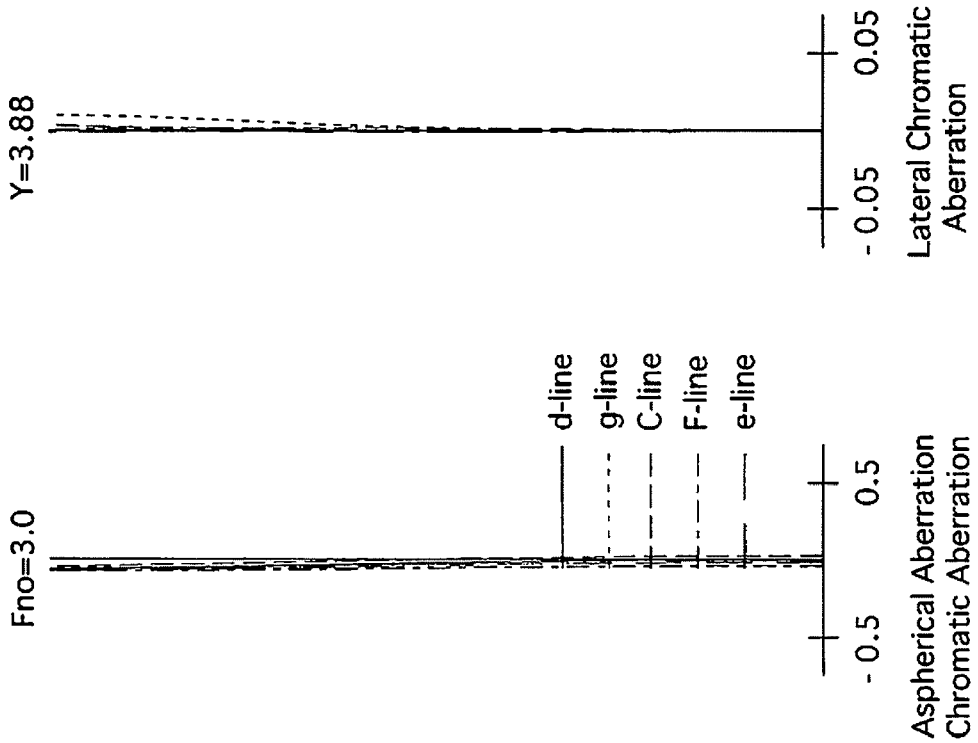

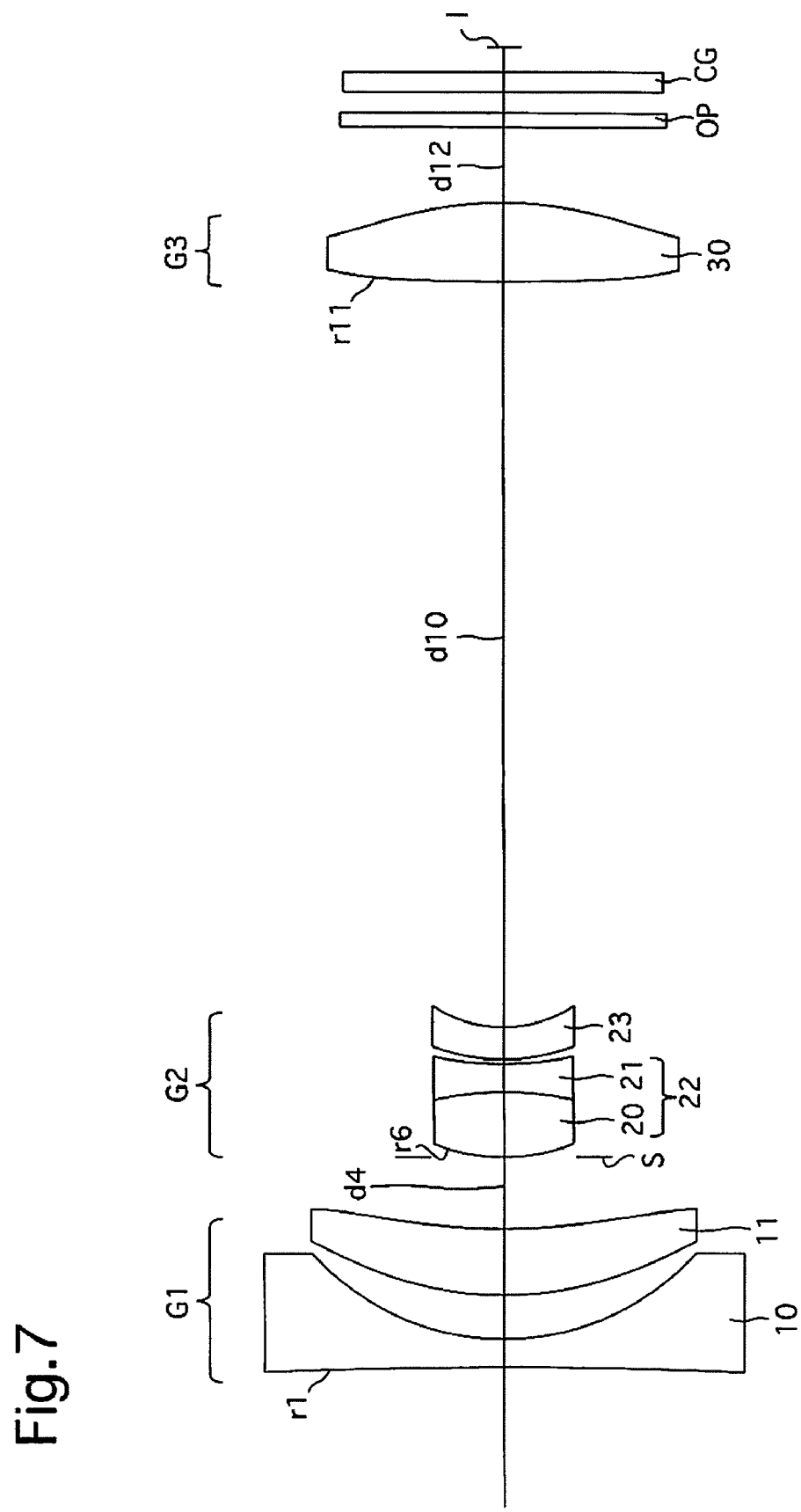

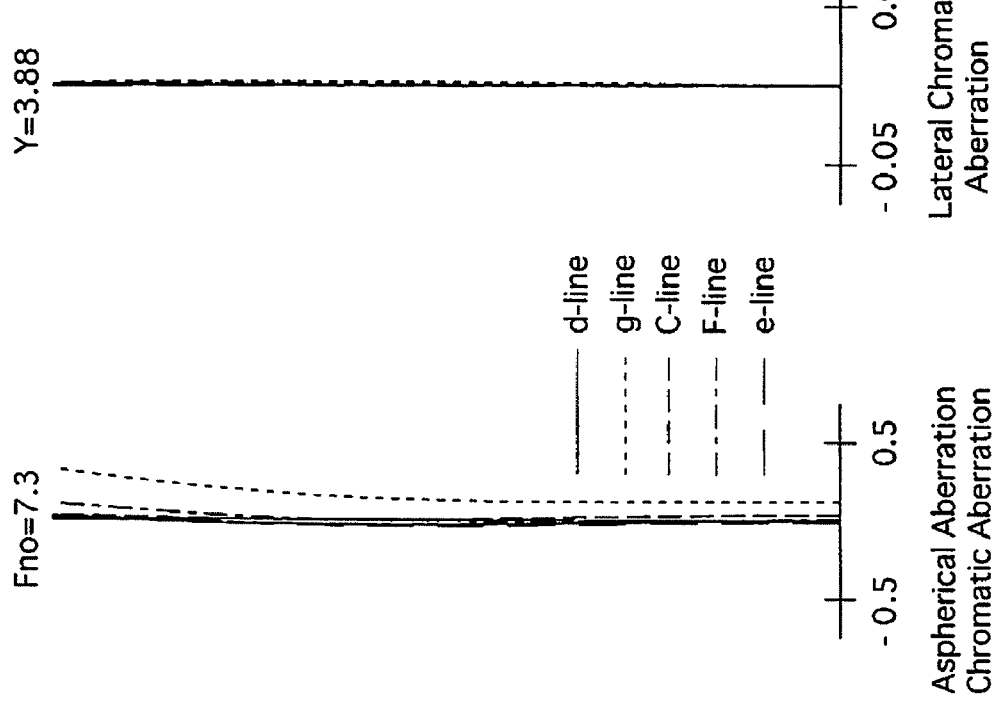

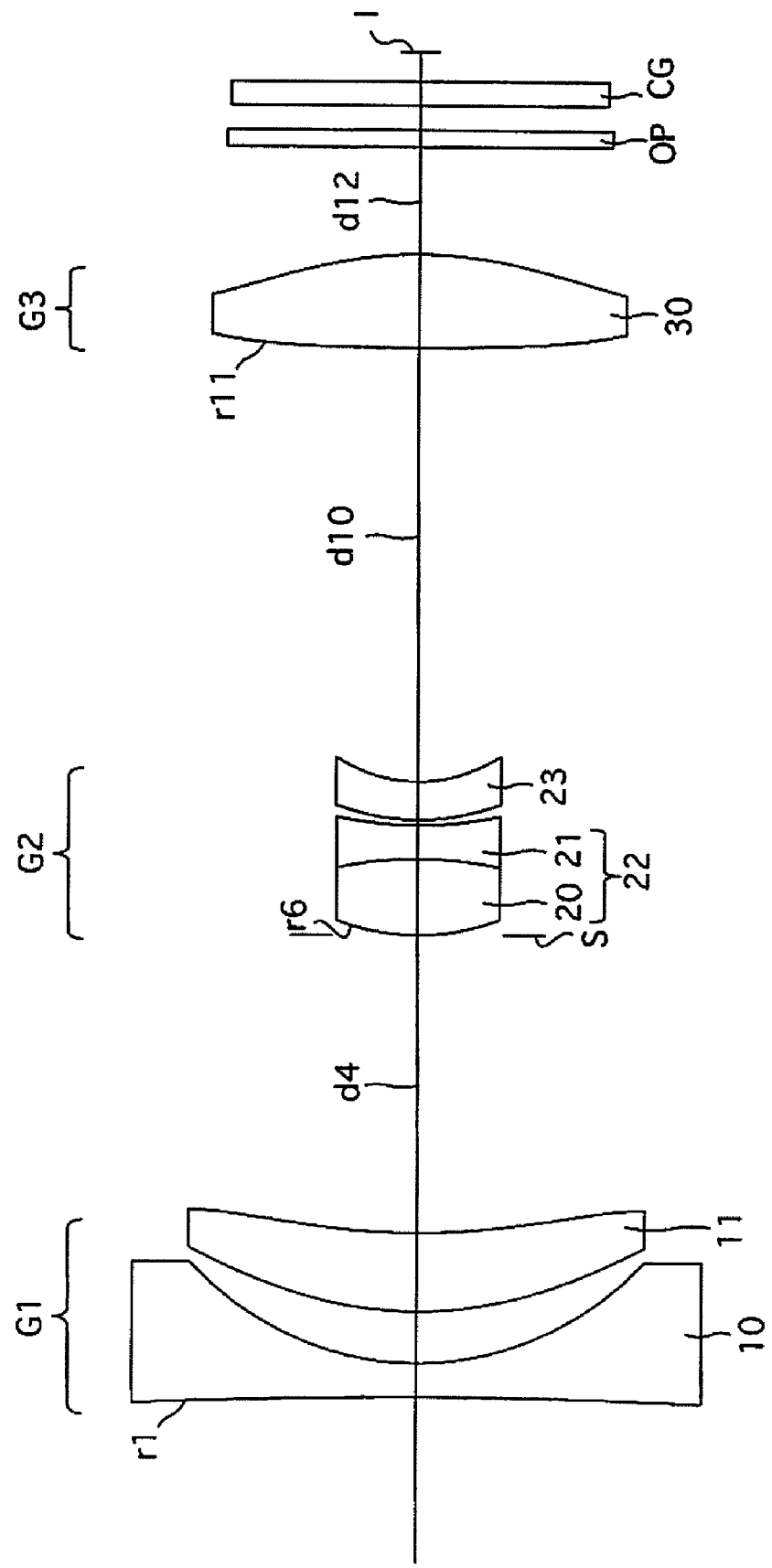

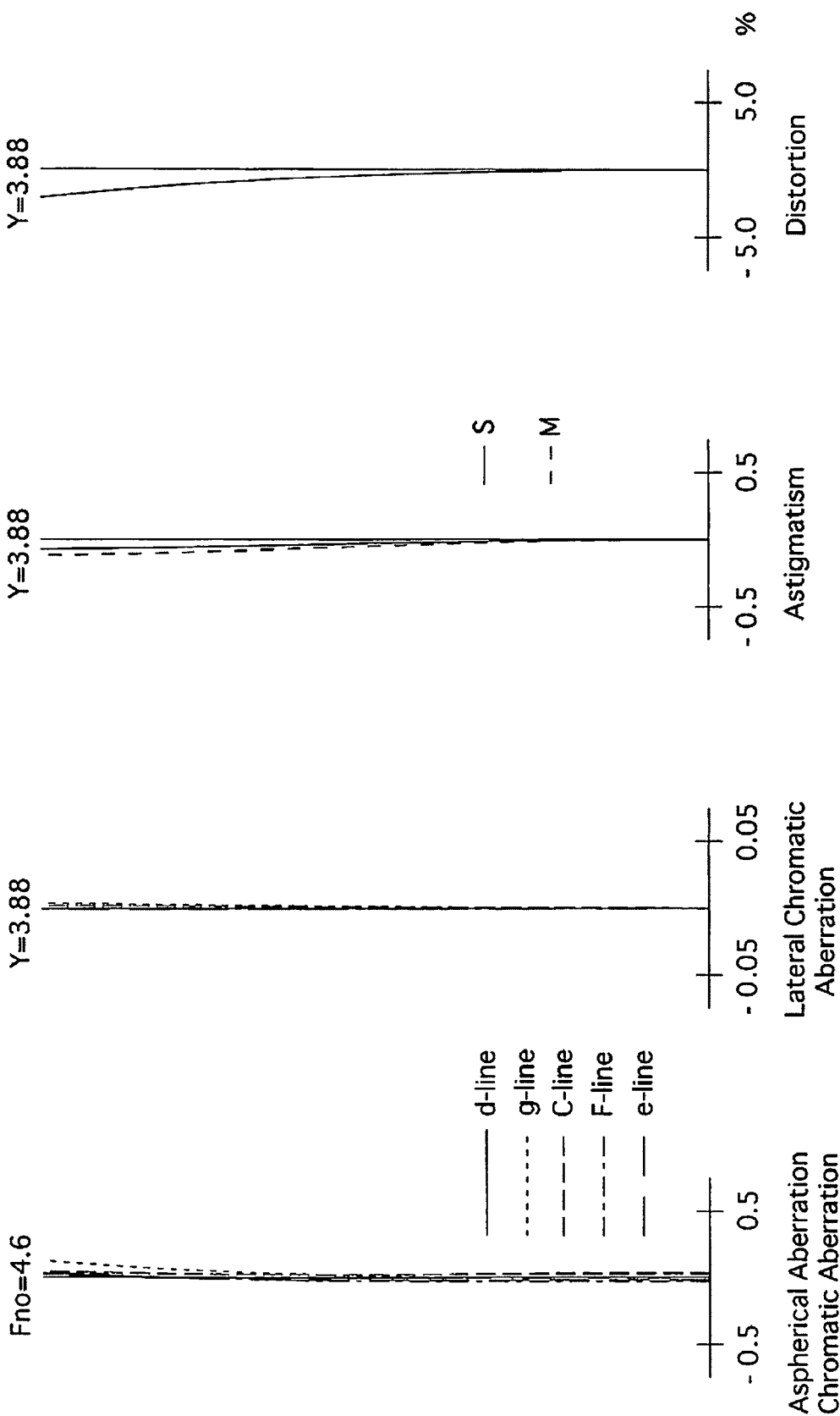

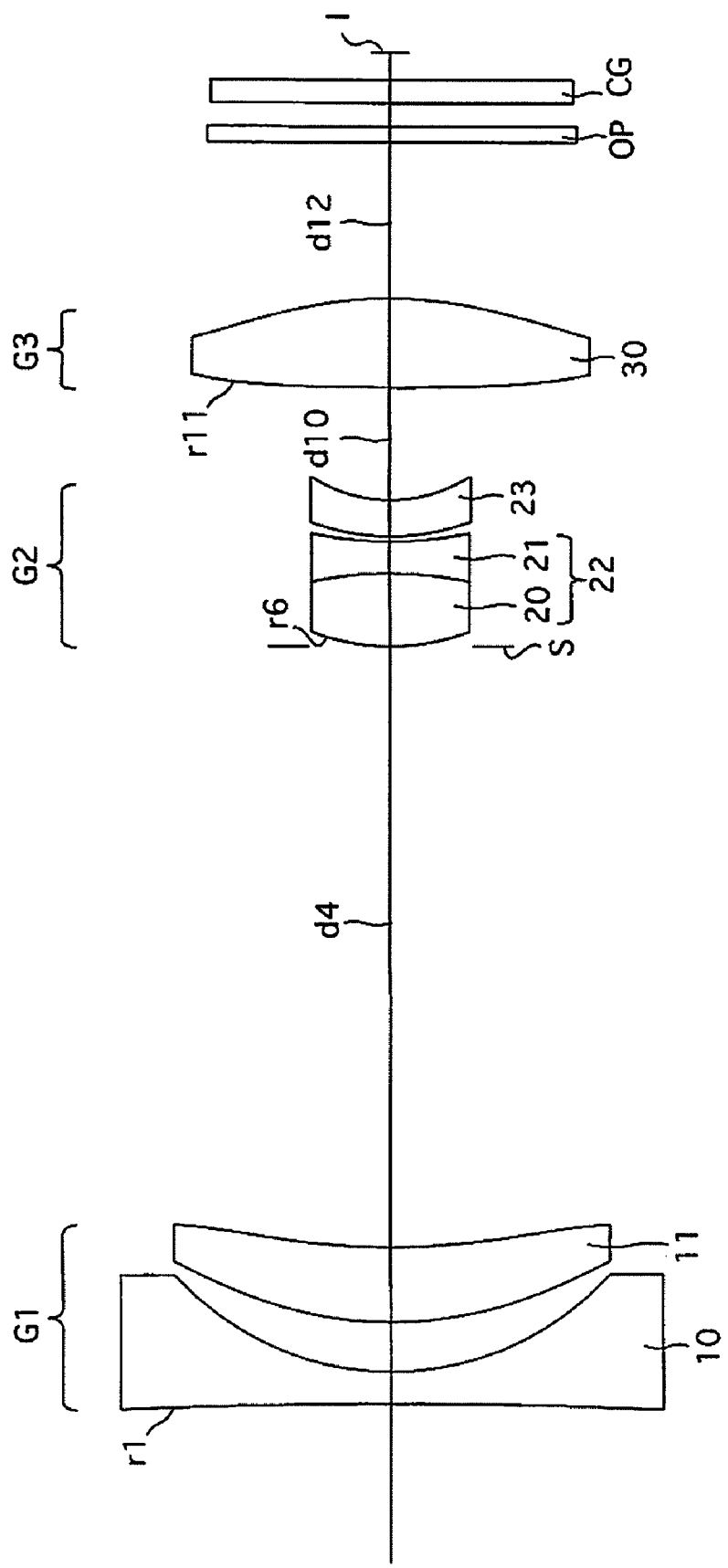

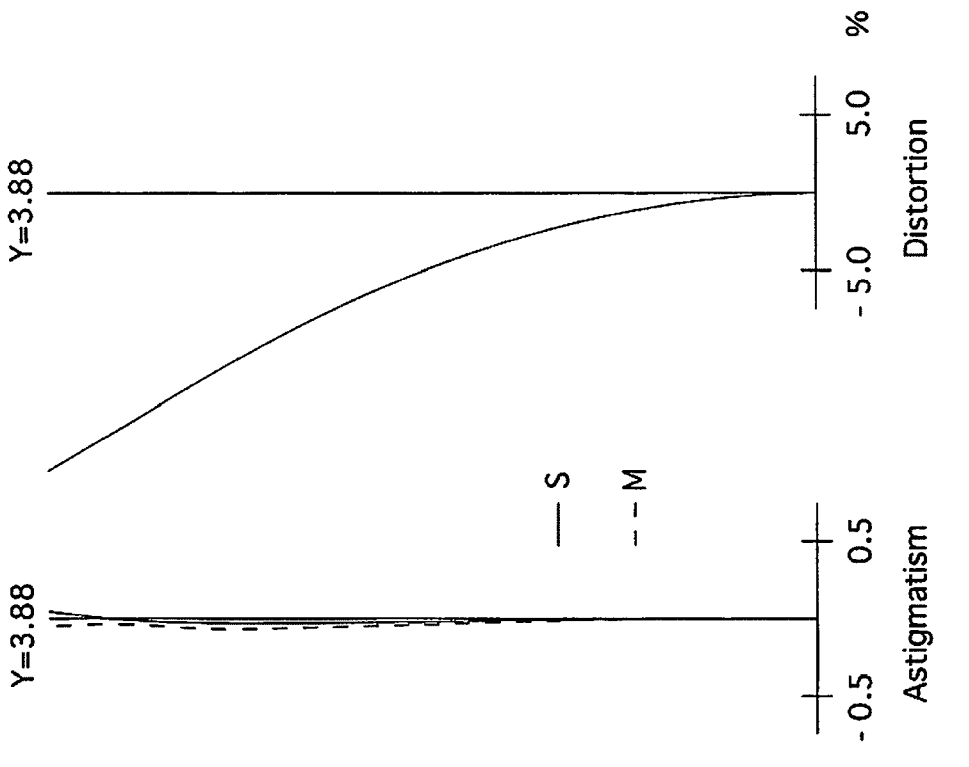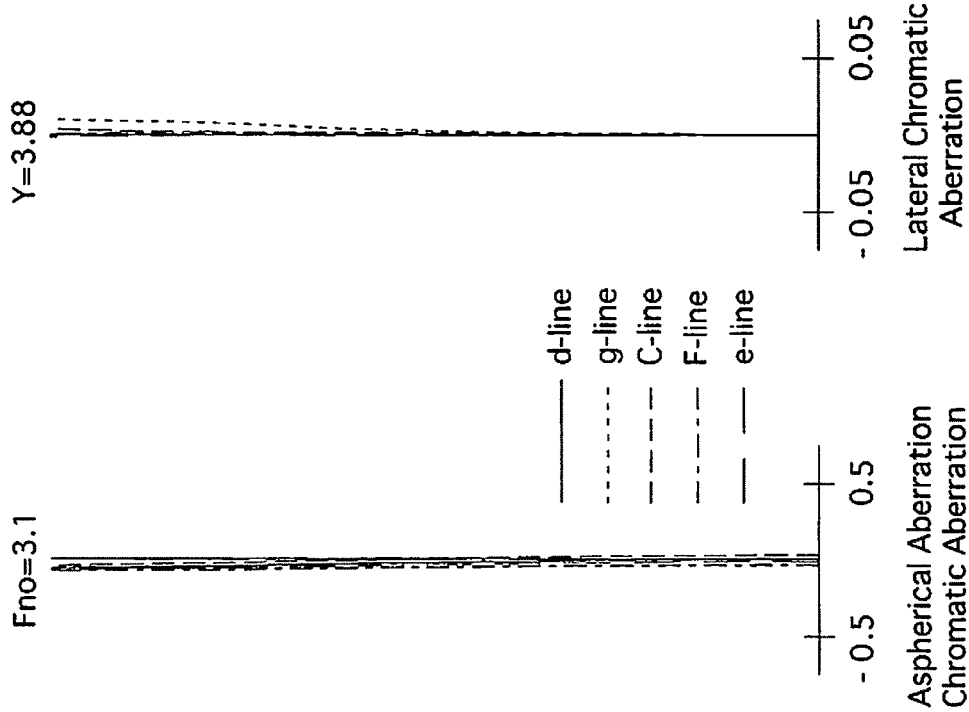

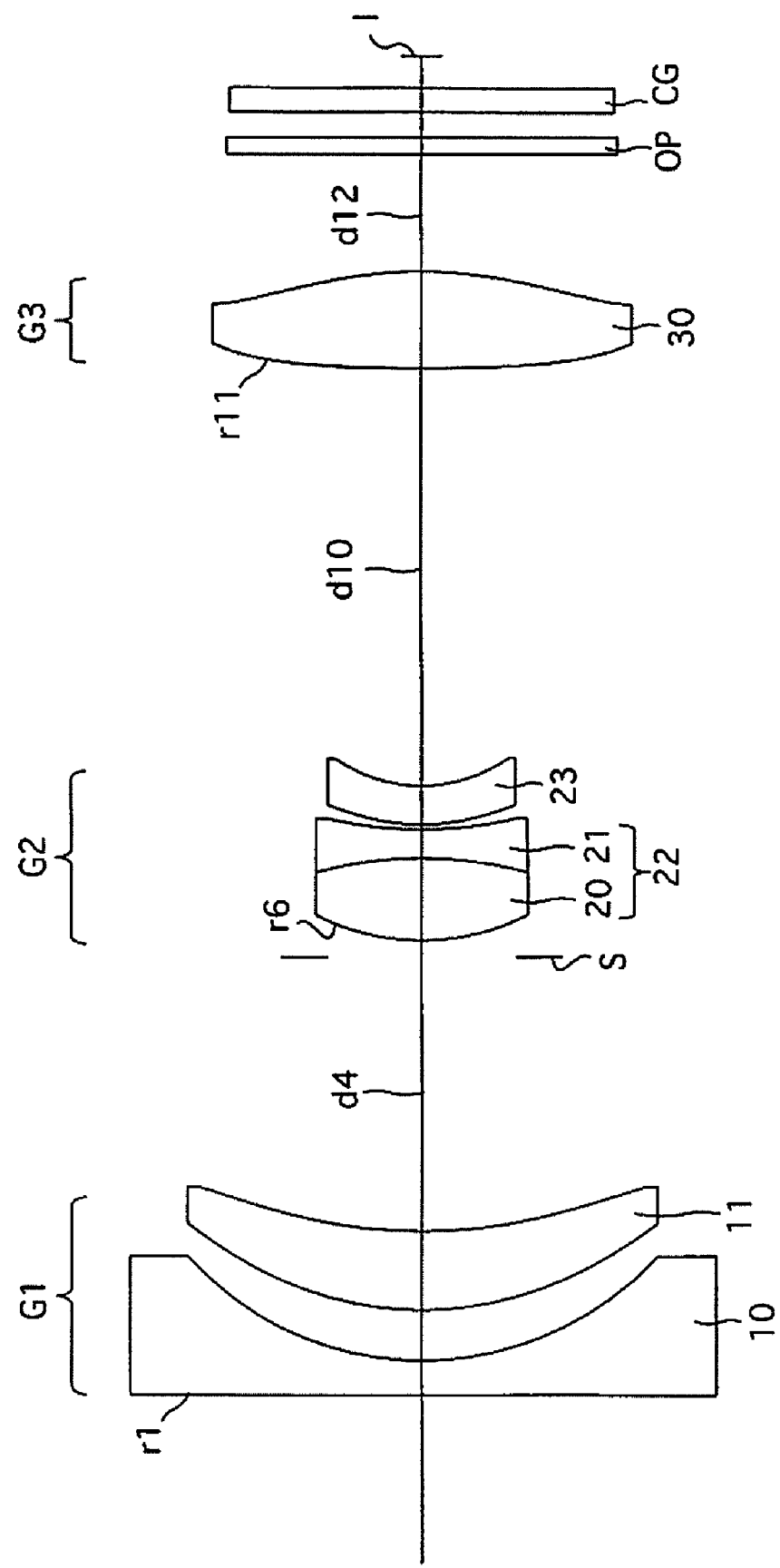

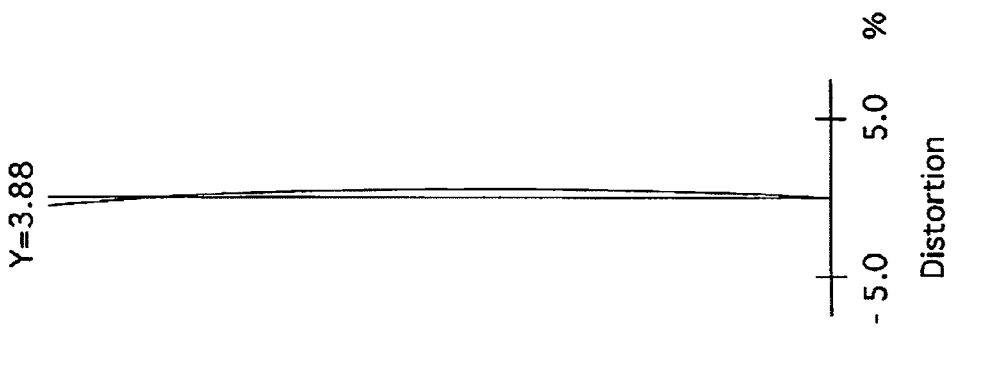
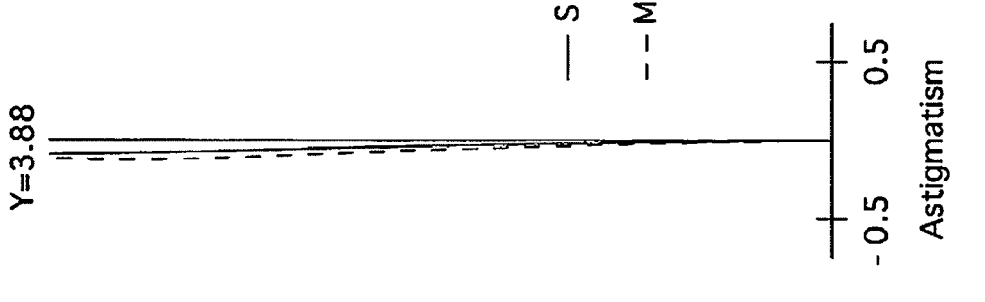
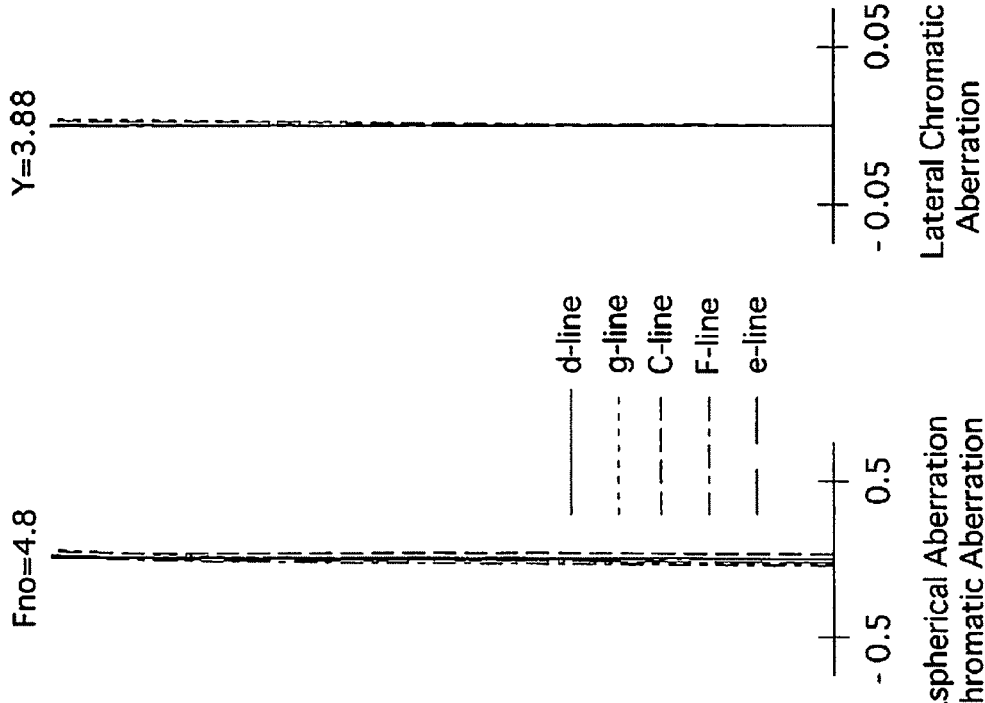

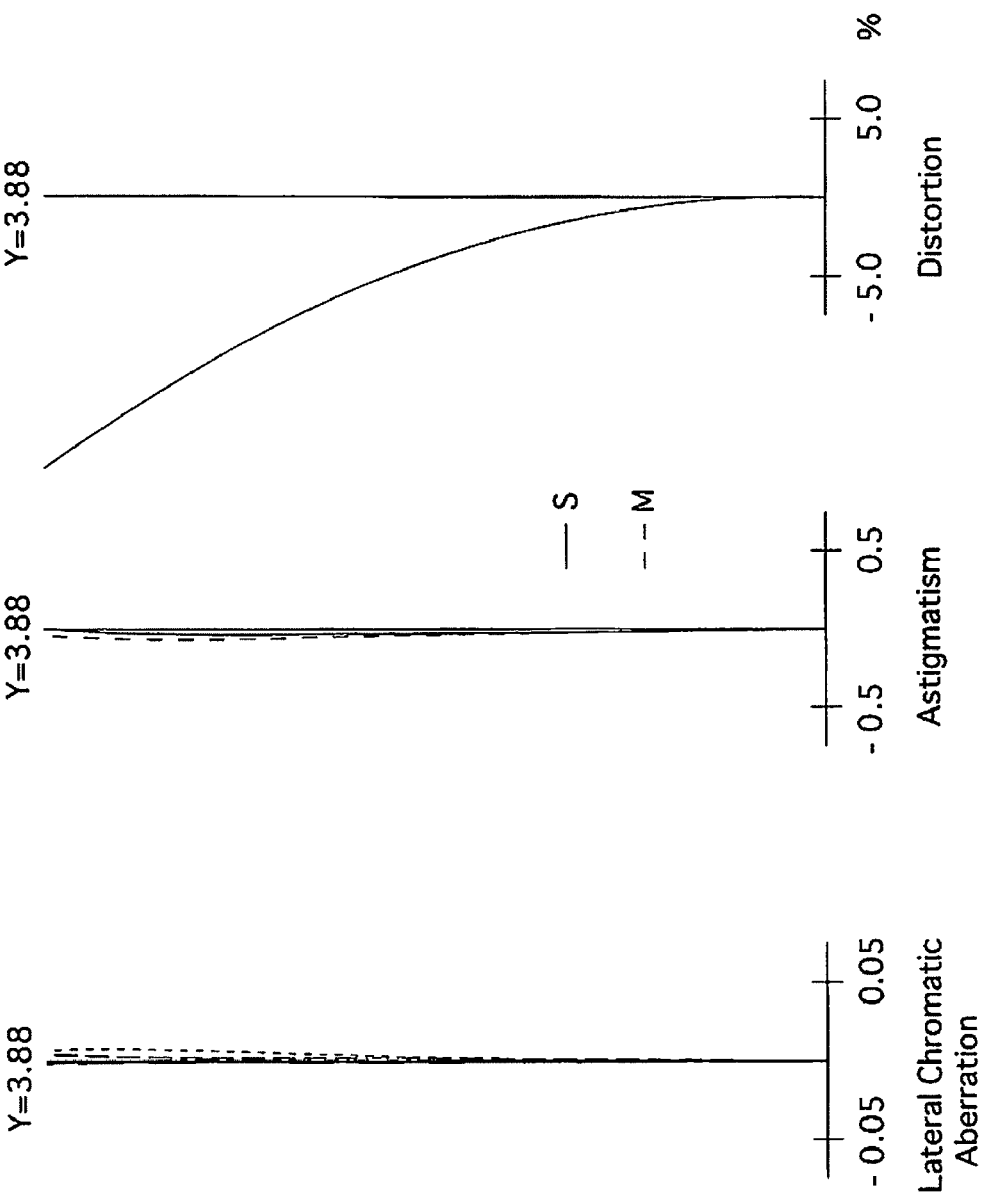

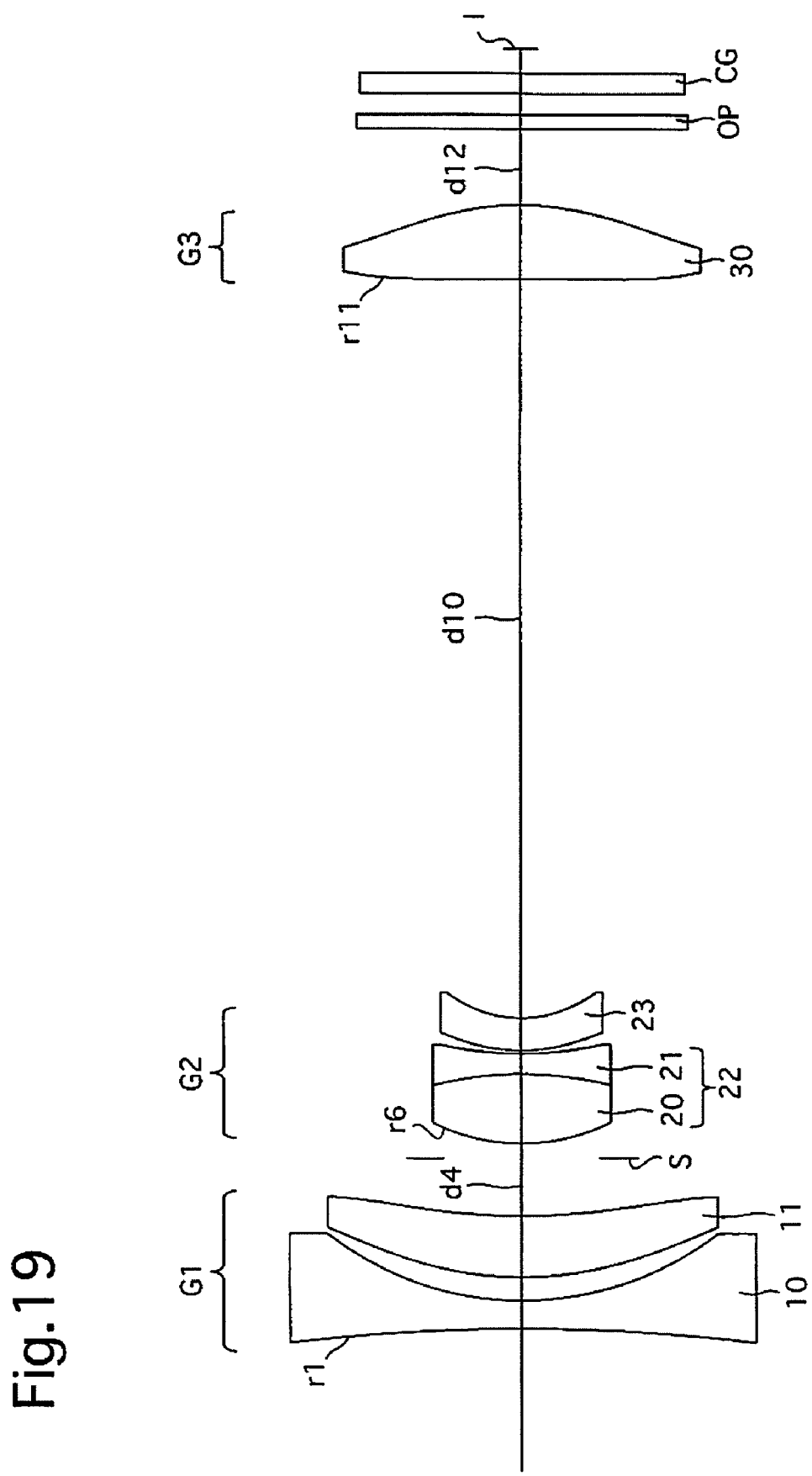

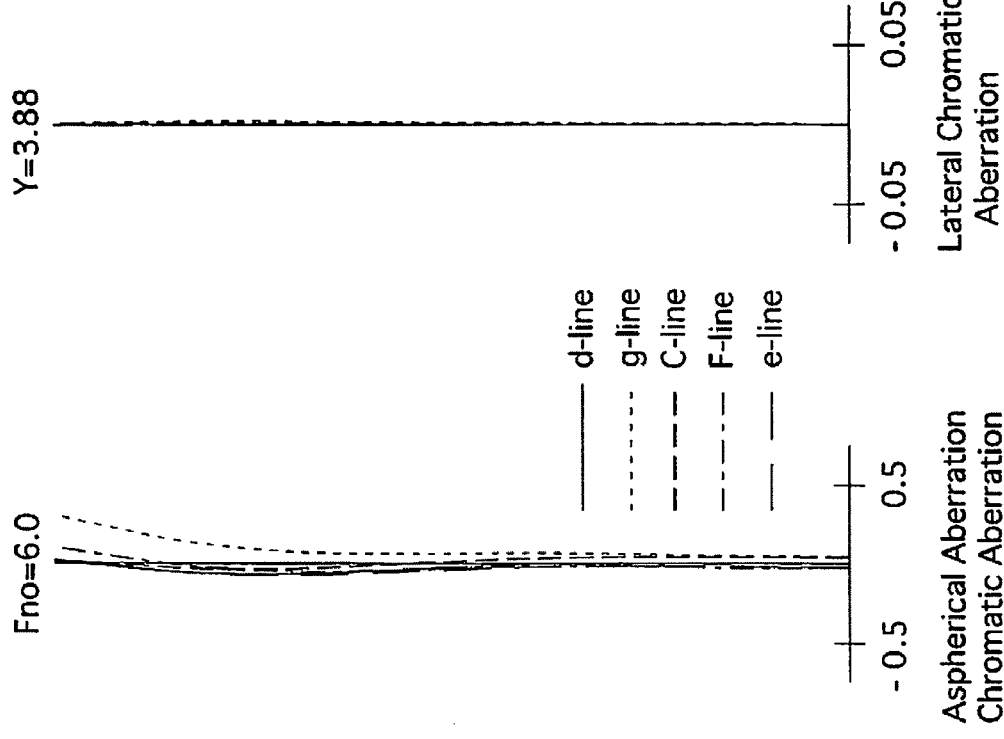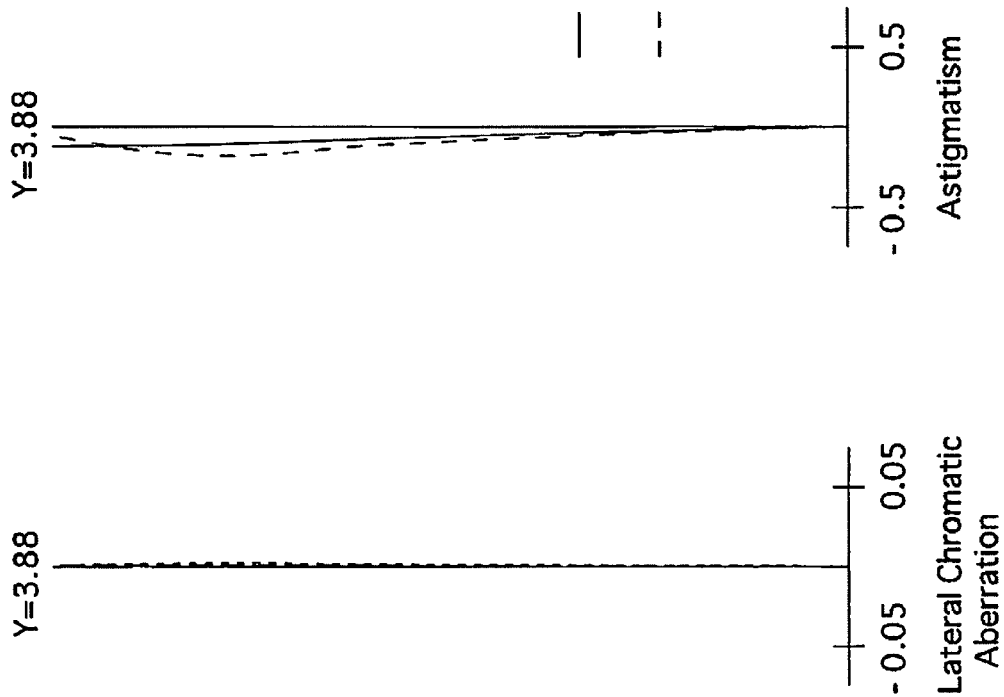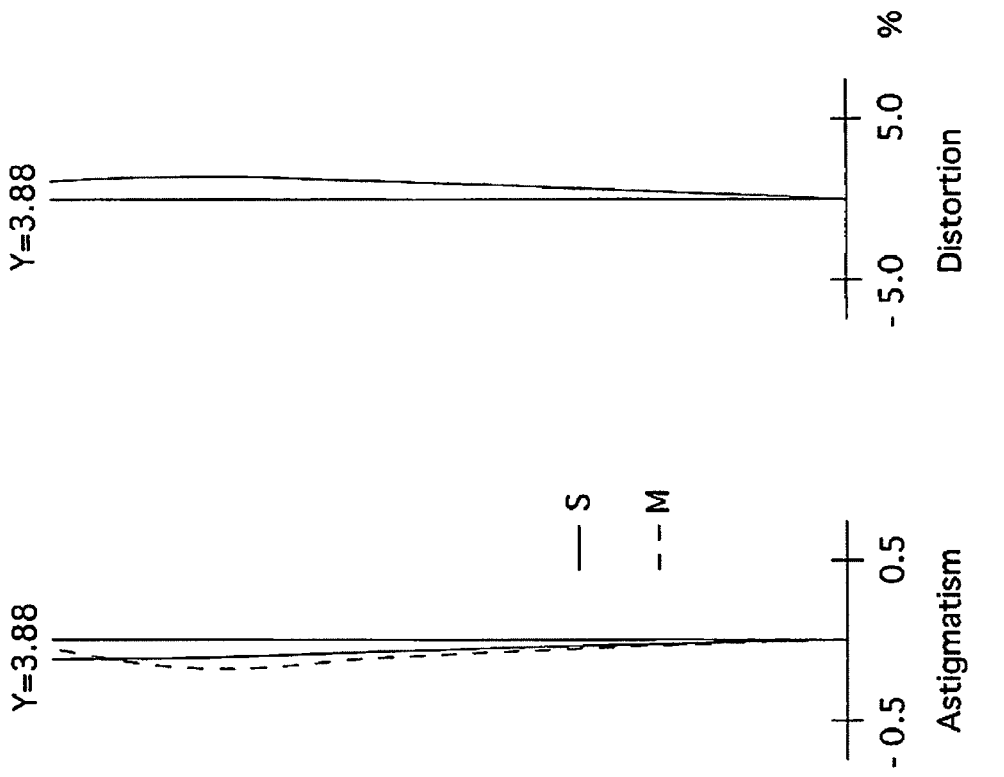

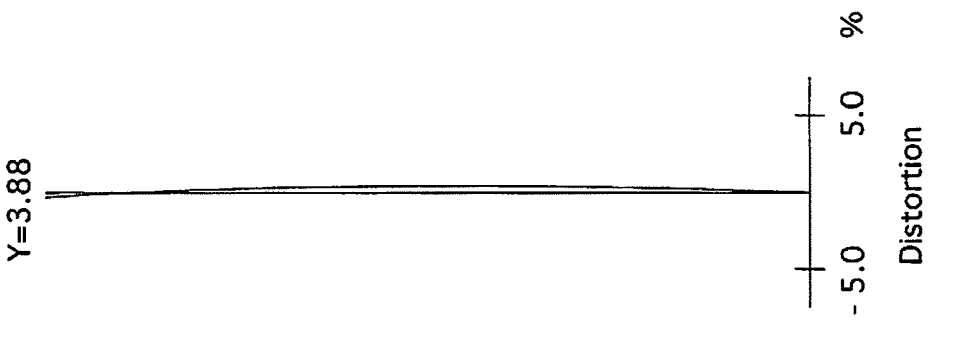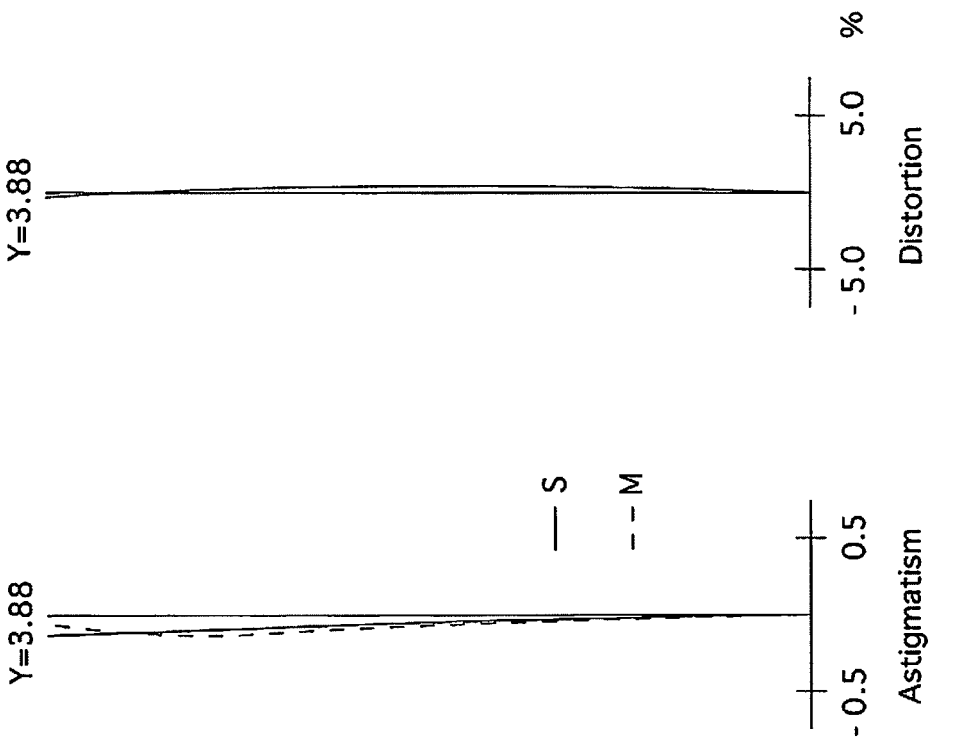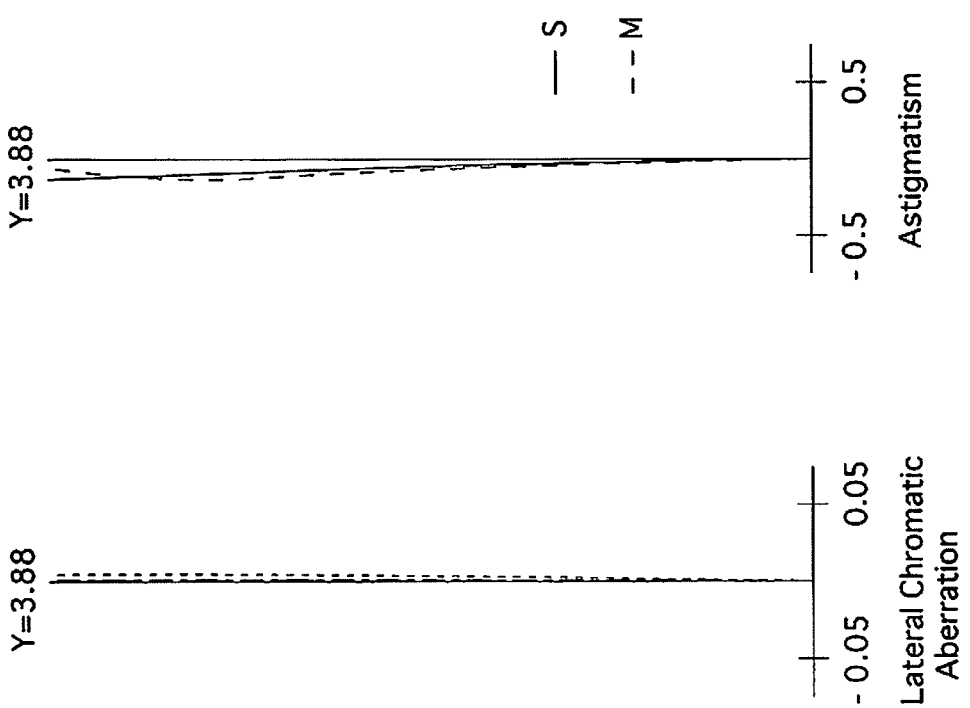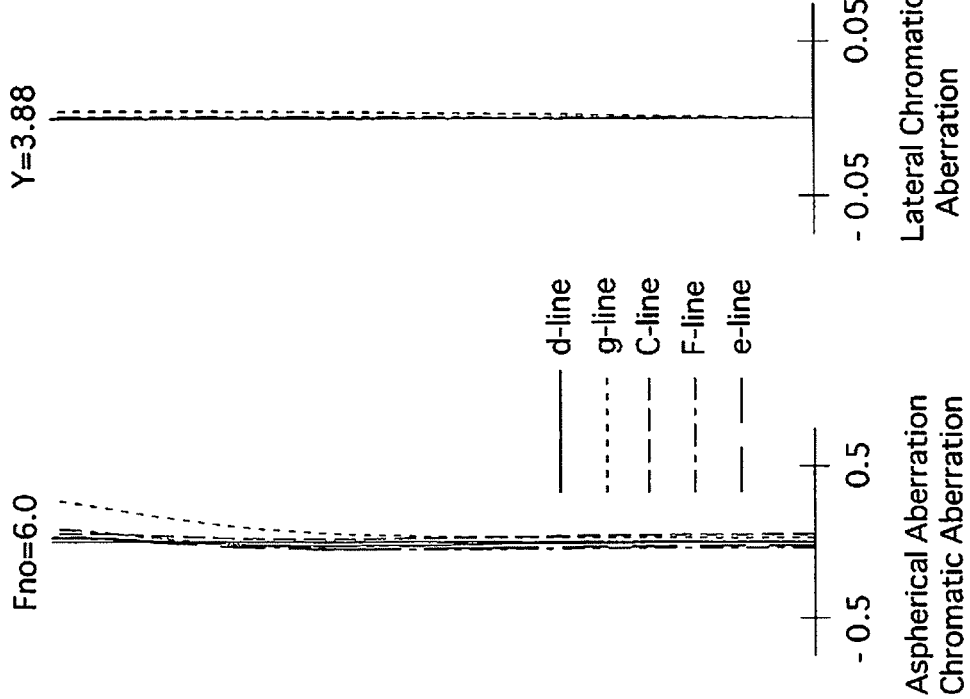

ZOOM LENS SYSTEM

BACKGROUND OF THE INVENTION

1. Field of the Invention

The present invention relates to a zoom lens system that is provided for imaging.

2. Description of Related Art

Due to the rapid popularization of digital cameras in recent years, lower-priced digital cameras have been in demand, and also there has been a strong demand for price reduction in regard to photographic optical systems. Furthermore, in compact digital cameras, there is a tendency for excellent portability to be desired, so that attempts are made to further miniaturize and slim down the digital camera. On the other hand, the number of pixels of solid-state image sensors, such as CCDs, etc., is increasing year by year. Accordingly, a high-quality photographic optical system that can cope with such fineness of pixel pitch is in demand.

A negative-lead zoom lens system is utilized as a zoom lens system for use in a compact digital camera having a zoom ratio of approximately 3:1 through 4:1. For example, Japanese Unexamined Patent Publication Nos. 2005-084597 and 2009-092740 both disclose a negative-lead zoom lens system having a negative lens group, a positive lens group and a positive lens group, in that order from the object side, i.e., a zoom lens system having three lens groups, in which a zoom ratio of approximately 3.7:1 is achieved.

However, the overall length of these optical systems and the thickness of each lens group are large, and hence do not satisfy the requirements for miniaturization. In order to achieve miniaturization of a camera at a non-photographable state, it is necessary for the overall length of the lens system to be reduced and for the thickness of each lens group to be made thinner. In order to shorten the overall length of the lens system, the refractive power of each lens group can be strengthened and the amount movement thereof during zooming can be reduced; however, the amount of aberrations occurring at the refractive surfaces of the lens elements increases so that aberration correction thereof becomes difficult. Moreover, the market demands such lens systems to be further miniaturized while attaining a higher zoom ratio and a higher optical quality.

SUMMARY OF THE INVENTION

The present invention has been devised with the above-mentioned issued in mind, and provides a zoom lens system that simultaneously achieves further miniaturization, a higher zoom ratio and a higher optical quality.

According to an aspect of the present invention, a zoom lens system is provided, including a negative first lens group, a positive second lens group, and a positive third lens group, in that order from the object side, wherein upon zooming from the short focal length extremity to the long focal length extremity, each of the first through third lens groups move along the optical axis. The second lens group includes a positive lens element, a negative lens element and a negative lens element, in that order from the object side, and wherein the following conditions (1) and (2) are satisfied:

$$2.0 < |VD1t - VD1w|/(ft/fw) < 3.4 \text{(mm)}. \quad (1),$$

and $$0.89 < |m2w/m3w| \quad (2),$$

wherein VD1t designates the distance (mm) along the optical axis, at the long focal length extremity, from the surface on the image side of the lens element provided closest to the image side within the first lens group to the surface on the object side of the positive lens element provided closest to the object side within the second lens group; VD1w designates the distance (mm) along the optical axis, at the short focal length extremity, from the surface on the image side of the lens element provided closest to the image side within the first lens group to the surface on the object side of the positive lens element provided closest to the object side within the second lens group; ft designates the focal length (mm) of the entire zoom lens system at the long focal length extremity; fw designates the focal length (mm) of the entire zoom lens system at the short focal length extremity; m2w designates the lateral magnification of the second lens group at the short focal length extremity when focused on an object at infinity; and m3w designates the lateral magnification of the third lens group at the short focal length extremity when focused on an object at infinity.

It is desirable for the following condition (3) to be satisfied:

$$2.8 < f2/rb < 4.0 \quad (3),$$

wherein f2 designates the combined focal length of the second lens group, and rb designates the radius of curvature of the surface on the image side of the negative lens element provided closest to the image side within the second lens group.

It is desirable for the positive lens element and the negative lens element, which is provided on the object side within the second lens group, to be bonded to each other to constitute a cemented lens.

It is desirable for the negative lens element provided on the image side within the second lens group to be a resin lens element provided with aspherical surfaces on both sides thereof.

It is desirable for the third lens group to be one positive lens element that constitutes a focusing lens group that is moved along the optical axis thereof during a focusing operation, and wherein the one positive lens element is made of resin and is provided with at least one aspherical surface.

According to the present invention, a zoom lens system is provided that simultaneously achieves further miniaturization, a higher zoom ratio and a higher optical quality.

The present disclosure relates to subject matter contained in Japanese Patent Application No. 2010-41487 (filed on Feb. 26, 2010) and No. 2010-234411 (filed on Oct. 19, 2010) which are expressly incorporated herein in their entireties.

BRIEF DESCRIPTION OF THE DRAWINGS

The present invention will be discussed below in detail with reference to the accompanying drawings, in which:

FIG. 1 shows a lens arrangement of a first numerical embodiment of the zoom lens system, according to the present invention, at the long focal length extremity when focused on an object at infinity;

FIGS. 2A, 2B, 2C and 2D show various aberrations that occurred in the lens arrangement shown in FIG. 1;

FIG. 3 shows a lens arrangement of the first numerical embodiment of the zoom lens system at an intermediate focal length when focused on an object at infinity;

FIGS. 4A, 4B, 4C and 4D show various aberrations that occurred in the lens arrangement shown in FIG. 3;

FIG. 5 shows a lens arrangement of the first numerical embodiment of the zoom lens system at the short focal length extremity when focused on an object at infinity;

FIGS. 6A, 6B, 6C and 6D show various aberrations that occurred in the lens arrangement shown in FIG. 5;

FIG. 7 shows a lens arrangement of a second numerical embodiment of the zoom lens system, according to the present invention, at the long focal length extremity when focused on an object at infinity;

FIGS. 8A, 8B, 8C and 8D show various aberrations that occurred in the lens arrangement shown in FIG. 7;

FIG. 9 shows a lens arrangement of the second numerical embodiment of the zoom lens system at an intermediate focal length when focused on an object at infinity;

FIGS. 10A, 10B, 10C and 10D show various aberrations that occurred in the lens arrangement shown in FIG. 9;

FIG. 11 shows a lens arrangement of the second numerical embodiment of the zoom lens system at the short focal length extremity when focused on an object at infinity;

FIGS. 12A, 12B, 12C and 12D show various aberrations that occurred in the lens arrangement shown in FIG. 11;

FIG. 15 shows a lens arrangement of the third numerical embodiment of the zoom lens system at an intermediate focal length when focused on an object at infinity;

FIGS. 16A, 16B, 16C and 16D show various aberrations that occurred in the lens arrangement shown in FIG. 15;

FIGS. 18A, 18B, 18C and 18D show various aberrations that occurred in the lens arrangement shown in FIG. 17;

FIG. 19 shows a lens arrangement of a fourth numerical embodiment of the zoom lens system, according to the present invention, at the long focal length extremity when focused on an object at infinity;

FIGS. 20A, 20B, 20C and 20D show various aberrations that occurred in the lens arrangement shown in FIG. 19;

FIGS. 26A, 26B, 26C and 26D show various aberrations that occurred in the lens arrangement shown in FIG. 25;

DESCRIPTION OF THE PREFERRED EMBODIMENTS

Figure 31:
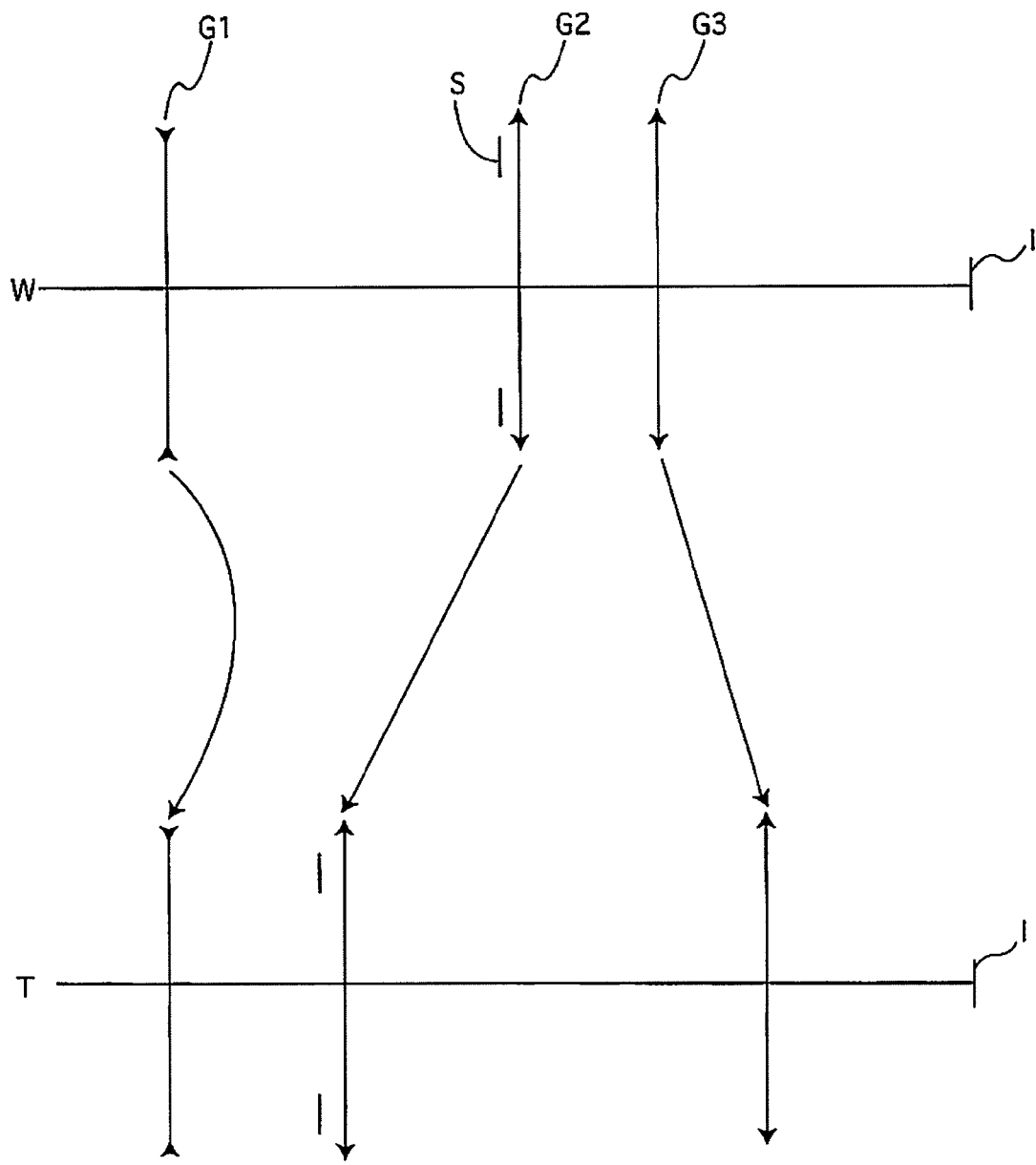
FIG. 31 shows a zoom path of the zoom lens system according to the present invention.

The zoom lens system according to the present invention includes a negative first lens group G1, a positive second lens group G2, and a positive third lens group G3, in that order from the object side, as shown in the zoom path diagram of FIG. 31. A diaphragm S is provided in between the first lens group G1 and the second lens group G2 and moves integrally with the second lens group G2. "I" designates the imaging plane.

Upon zooming from the short focal length extremity (W) to the long focal length extremity (T), the first through third lens groups G1 through G3 move along the optical axis in a manner such that the distance between the first lens group G1 and the second lens group G2 decreases, and the distance between the second lens group G2 and the third lens group G3 increases. More specifically, upon zooming from the short focal length extremity (W) to the long focal length extremity (T), the first lens group G1 first moves toward the image side and thereafter moves toward the object side, the second lens group G2 monotonically moves toward the object side, and the third lens group G3 moves monotonically toward the image side.

The first lens group G1 is configured of a negative lens element 10 and a positive lens element 11, in that order from the object side. The negative lens element 10 is a negative biconcave lens element (numerical embodiments 1 through 4) or is a negative meniscus lens element (numerical embodiment 5) having a convex surface on the object side. In each of the first through fifth numerical embodiments, the positive lens element 11 is a positive meniscus lens element having a convex surface on the object side and having an aspherical surface on each side thereof.

As shown in the lens arrangements of the first through fifth embodiments, the second lens group G2 is configured of a cemented lens 22 having a positive lens element 20 and a negative lens element 21, in that order from the object side, and a negative lens element 23, in that order from the object side. The positive lens element 20 is a positive biconvex lens element and the negative lens element 21 is a biconcave negative lens element. The negative lens element 23 is a negative meniscus lens element having a convex surface on the object side and is a resin lens having an aspherical surface on each side thereof.

The third lens group G3 is a focusing lens group that is moved during a focusing operation and is configured of a single positive lens element 30. The positive lens element 30 is configured of a biconvex positive lens element (first through third and fifth numerical embodiments) or a positive meniscus lens element (fourth numerical embodiment) having a convex surface on the image side and is a resin lens having an aspherical surface on each side thereof.

Condition (1) specifies the ratio of the change in distance between the first and second lens groups G1 and G2 during zooming to the zoom ratio of the zoom lens system, in order to achieve further miniaturization, a higher zoom ratio and a higher quality.

In order to achieve a small (miniaturized) zoom lens system that has a high zoom ratio, the refractive power of each lens group can be strengthened, and the distance between the first lens group G1 and the second lens group G2 that contribute to zooming can be shortened. However, if the upper limit of condition (1) is exceeded, the refractive power of each lens group becomes weak, which is advantageous with respect to aberration correction; however, in order attain a desired zoom ratio, it is necessary to increase the distance between the first lens group G1 and the second lens group G2, causing difficulties in achieving miniaturization. If the lower limit of condition (1) is exceeded, the refractive power of each lens group (first and second lens groups G1 and G2) that contributes to zooming is strengthened, which is advantageous for further miniaturizing the zoom lens system, however, aberration correction becomes difficult.

Condition (2) specifies the ratio of the lateral magnification of the second lens group G2 to that of the third lens group G3 when focusing on an object at infinity at the short focal length extremity. Satisfying condition (2) enables further miniaturization of the zoom lens system.

If the lower limit of condition (2) is exceeded, the refractive power of the second lens group G2 weakens, which is advantageous for aberration correction; however, since the distance along the optical axis from the second lens group G2 to the imaging plane increases, miniaturization of the zoom lens system becomes difficult.

Condition (3) specifies the ratio of the combined focal length of the second lens group G2 to the radius of curvature of the surface on the image side of the lens element provided closest to the image side within the second lens group G2. Satisfying condition (3) enables a reduction in the overall length of the zoom lens system.

If the upper limit of condition (3) is exceeded, the abaxial light rays passing through the zoom lens system diverge so it becomes difficult to maintain telecentricity.

If the lower limit of condition (3) is exceeded, the diverging effect of the abaxial light rays at the short focal length extremity becomes small, so that the overall length of the zoom lens system cannot be adequately shortened.

The second lens group G2, as shown in each numerical embodiment, is configured of a positive lens element, a negative lens element and a negative lens element, in that order from the object side.

According to this arrangement, it is desirable for the third lens element within the second lens group G2 (i.e., the negative lens element on the image side) to be a resin lens having an aspherical surface on each side thereof in order to achieve a higher optical quality and reduce costs. The aspherical surfaces correct spherical and coma aberrations over the entire zooming range; moreover, by forming both of these surfaces as aspherical surfaces, the aberration correction burden is shared so that occurrence of aberrations can be reduced at each aspherical surface. Accordingly, it becomes possible to reduce the sensitivity of optical quality deterioration due to decentration of the lens elements occurring during assembly.

The third lens group G3, which is a focusing lens group that is moved during focusing, is a positive single lens element made of resin having an aspherical surface on each side in each of the numerical embodiments; however, it is sufficient for at least one surface thereof to be formed as an aspherical surface. According to such an arrangement, a reduction in cost can be achieved while deterioration of the optical quality can be reduced during focusing from an object at infinity to an object located at a close distance.

Embodiments

Specific numerical embodiments will be herein discussed. The following numerical embodiments correspond to a zoom lens system used in a photographic camera, an electronic still camera or a video camera. In the aberration diagrams and the tables, the d-line, g-line, C-line, F-line and e-line show aberrations at their respective wave-lengths; S designates the sagittal image, M designates the meridional image, Fno. designates the f-number, f designates the focal length of the entire optical system, W designates the half angle of view (°), Y designates the image height, fB designates the backfocus, L designates the overall length of the lens system, r designates the radius of curvature, d designates the lens thickness or distance between lenses, Nd designates the refractive index of the d-line, and vd designates the Abbe's number at the d-line. The values for the f-number, the focal length, the half angle-of-view, the image height, the backfocus, the overall length of the lens system, and the distance between lenses (which changes during zooming and according to the overall length of the lens system) are shown in the following order: short focal length extremity, intermediate focal length, and long focal length extremity.

An aspherical surface which is rotationally symmetrical about the optical axis is defined as:

$$x=cy^2/(1+[1-\{1+K\}c^2y^2]^{1/2})+A4y^4+A6y^6+A8y^8+A10y^{10}+A12y^{12}$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

Embodiment 1

FIGS. 1 through 6D and Tables 1 through 4 show a first numerical embodiment of a zoom lens system according to the present invention. FIG. 1 shows a lens arrangement of the first numerical embodiment of the zoom lens system at the long focal length extremity when focused on an object at infinity. FIGS. 2A, 2B, 2C and 2D show various aberrations that occurred in the lens arrangement shown in FIG. 1. FIG. 3 shows a lens arrangement of the first numerical embodiment of the zoom lens system at an intermediate focal length when focused on an object at infinity. FIGS. 4A, 4B, 4C and 4D show various aberrations that occurred in the lens arrangement shown in FIG. 3. FIG. 5 shows a lens arrangement of the first numerical embodiment of the zoom lens system at the short focal length extremity when focused on an object at infinity. FIGS. 6A, 6B, 6C and 6D show various aberrations that occurred in the lens arrangement shown in FIG. 5. Table 1 shows the lens surface data, Table 2 shows various zoom lens system data, Table 3 shows the aspherical surface data, and Table 4 shows the zoom lens group data of the first numerical embodiment.

The zoom lens system of the first numerical embodiment is configured of a negative first lens group G1, a positive second lens group G2, and a positive third lens group G3, in that order from the object side.

The first lens group G1 (surface Nos. 1 through 4) is configured of a biconcave negative lens element 10 and a positive meniscus lens element 11 having a convex surface on the object side, in that order from the object side. Both sides of the positive meniscus lens element 11 are aspherical surfaces.

The second lens group G2 (surface Nos. 6 through 10) is configured of a cemented lens 22 having a biconvex positive lens element 20 and a biconcave negative lens element 21, in that order from the object side, and a negative meniscus lens element 23 having a convex surface on the object side, in that order from the object side. The negative meniscus lens element 23 is a resin lens having an aspherical surface formed on each side thereof. A diaphragm S (surface No. 5) is provided in between the first lens group G1 and the second lens group G2 and moves integrally with the second lens group G2.

The third lens group G3 (surface Nos. 11 and 12) is configured of one biconvex positive lens element 30 which constitutes a focusing lens group that is moved along the optical axis during focusing. The biconvex positive lens element 30 is a resin lens having an aspherical surface on each side. An optical filter OP (surface Nos. 13 and 14) and a cover glass CG (surface Nos. 15 and 16) are provided behind the third lens group G3 (the biconvex positive lens element 30) between the third lens group G3 and the imaging plane I.

TABLE 1

LENS SURFACE DATA

| Surf. No. | r | d | Nd | νd |
|---|---|---|---|---|
| 1 | −138.945 | 0.700 | 1.75500 | 52.3 |
| 2 | 6.478 | 1.090 | | |
| 3* | 8.391 | 1.640 | 1.82115 | 24.1 |
| 4* | 14.646 | d4 | | |
| 5 (Diaphragm) | ∞ | 0.500 | | |
| 6 | 4.831 | 1.600 | 1.88300 | 40.8 |
| 7 | −8.323 | 0.700 | 1.75211 | 25.0 |
| 8 | 8.323 | 0.110 | | |
| 9* | 4.539 | 0.800 | 1.60641 | 27.2 |
| 10* | 3.169 | d10 | | |
| 11* | 69.562 | 1.950 | 1.54358 | 55.7 |
| 12* | −8.970 | d12 | | |
| 13 | ∞ | 0.350 | 1.51680 | 64.2 |
| 14 | ∞ | 0.510 | | |
| 15 | ∞ | 0.500 | 1.51680 | 64.2 |
| 16 | ∞ | — | | |

The asterisk (*) designates an aspherical surface which is rotationally symmetrical with respect to the optical axis.

TABLE 2

ZOOM LENS SYSTEM DATA
Zoom Ratio 3.86

| Short Focal Length Extremity | |
|---|---|
| Fno. | 3.0 |
| f | 5.00 |
| W | 43.4 |
| Y | 3.88 |
| fB | 0.59 |
| L | 29.78 |
| d4 | 12.700 |
| d10 | 2.457 |
| d12 | 3.399 |
| Intermediate Focal Length | |
| Fno. | 4.4 |
| f | 9.80 |
| W | 22.0 |
| Y | 3.88 |
| fB | 0.59 |
| L | 28.18 |
| d4 | 5.647 |
| d10 | 9.007 |
| d12 | 2.304 |
| Long Focal Length Extremity | |
| Fno. | 6.1 |
| f | 19.30 |
| W | 11.5 |
| Y | 3.88 |
| fB | 0.59 |
| L | 32.85 |
| d4 | 1.270 |

TABLE 2-continued

ZOOM LENS SYSTEM DATA
Zoom Ratio 3.86

| d10 | 18.508 |
|---|---|
| d12 | 1.850 |

TABLE 3

ASPHERICAL SURFACE DATA (aspherical surface coefficients not indicated are zero (0.00)):

| Surf. No. | K | A4 | A6 | A8 |
|---|---|---|---|---|
| 3 | 0.000 | $-0.2552 \times 10^{-3}$ | $0.4700 \times 10^{-5}$ | $-0.3106 \times 10^{-6}$ |
| 4 | 0.000 | $-0.4522 \times 10^{-3}$ | $0.2326 \times 10^{-5}$ | $-0.3545 \times 10^{-6}$ |
| 9 | 0.000 | $-0.2441 \times 10^{-2}$ | $0.1215 \times 10^{-3}$ | $-0.2283 \times 10^{-3}$ |
| 10 | −0.251 | $0.1375 \times 10^{-2}$ | $0.8698 \times 10^{-3}$ | $-0.5452 \times 10^{-3}$ |
| 11 | 0.000 | $0.5377 \times 10^{-3}$ | $-0.4626 \times 10^{-5}$ | $0.7597 \times 10^{-7}$ |
| 12 | 0.000 | $0.9573 \times 10^{-3}$ | $-0.4071 \times 10^{-5}$ | $-0.2458 \times 10^{-6}$ |

| Surf. No. | A10 |
|---|---|
| 9 | $0.2751 \times 10^{-4}$ |
| 10 | $0.7753 \times 10^{-4}$ |
| 11 | $0.1298 \times 10^{-7}$ |
| 12 | $0.2221 \times 10^{-7}$ |

TABLE 4

ZOOM LENS GROUP DATA

| Lens Group | First Surface | Focal Length |
|---|---|---|
| 1 | 1 | −13.27 |
| 2 | 6 | 9.52 |
| 3 | 11 | 14.75 |

Embodiment 2

FIGS. 7 through 12D and Tables 5 through 8 show a second numerical embodiment of a zoom lens system according to the present invention. FIG. 7 shows a lens arrangement of the second numerical embodiment of the zoom lens system at the long focal length extremity when focused on an object at infinity. FIGS. 8A, 8B, 8C and 8D show various aberrations that occurred in the lens arrangement shown in FIG. 7. FIG. 9 shows a lens arrangement of the second numerical embodiment of the zoom lens system at an intermediate focal length when focused on an object at infinity. FIGS. 10A, 10B, 100 and 10D show various aberrations that occurred in the lens arrangement shown in FIG. 9. FIG. 11 shows a lens arrangement of the second numerical embodiment of the zoom lens system at the short focal length extremity when focused on an object at infinity. FIGS. 12A, 12B, 12C and 12D show various aberrations that occurred in the lens arrangement shown in FIG. 11. Table 5 shows the lens surface data, Table 6 shows various zoom lens system data, Table 7 shows the aspherical surface data, and Table 8 shows the zoom lens group data of the second numerical embodiment.

The lens arrangement of the second numerical embodiment is the same as that of first numerical embodiment, except for the diaphragm S being positioned in a plane that is tangent to the front surface of the second lens group G2 (the biconvex positive lens element 20).

TABLE 5

LENS SURFACE DATA

| Surf. No. | r | d | Nd | νd |
|---|---|---|---|---|
| 1 | −131.152 | 0.700 | 1.75500 | 52.3 |
| 2 | 6.483 | 1.084 | | |
| 3* | 8.415 | 1.646 | 1.82115 | 24.1 |
| 4* | 14.818 | d4 | | |
| 5 (Diaphragm) | ∞ | 0.000 | | |
| 6 | 4.827 | 1.600 | 1.88300 | 40.8 |
| 7 | −8.315 | 0.700 | 1.75211 | 25.0 |
| 8 | 8.315 | 0.110 | | |
| 9* | 4.571 | 0.800 | 1.60641 | 27.2 |
| 10* | 3.182 | d10 | | |
| 11* | 88.696 | 1.950 | 1.54358 | 55.7 |
| 12* | −8.671 | d12 | | |
| 13 | ∞ | 0.350 | 1.51680 | 64.2 |
| 14 | ∞ | 0.510 | | |
| 15 | ∞ | 0.500 | 1.51680 | 64.2 |
| 16 | ∞ | — | | |

The asterisk (*) designates an aspherical surface which is rotationally symmetrical with respect to the optical axis.

TABLE 6

ZOOM LENS SYSTEM DATA
Zoom Ratio 3.86

Short Focal Length Extremity

| | |
|---|---|
| Fno. | 3.1 |
| f | 5.00 |
| W | 43.4 |
| Y | 3.88 |
| fB | 0.59 |
| L | 29.79 |
| d4 | 13.200 |
| d10 | 2.462 |
| d12 | 3.409 |

Intermediate Focal Length

| | |
|---|---|
| Fno. | 4.6 |
| f | 9.80 |
| W | 22.0 |
| Y | 3.88 |
| fB | 0.59 |
| L | 28.27 |
| d4 | 6.220 |
| d10 | 9.093 |
| d12 | 2.233 |

Long Focal Length Extremity

| | |
|---|---|
| Fno. | 7.3 |
| f | 19.30 |
| W | 11.5 |
| Y | 3.88 |
| fB | 0.59 |
| L | 32.85 |
| d4 | 1.770 |
| d10 | 18.510 |
| d12 | 1.850 |

TABLE 7

ASPHERICAL SURFACE DATA (aspherical surface coefficients not indicated are zero (0.00)):

| Surf. No. | K | A4 | A6 | A8 |
|---|---|---|---|---|
| 3 | 0.000 | −0.2593 × 10⁻³ | 0.4878 × 10⁻⁵ | −0.3146 × 10⁻⁶ |
| 4 | 0.000 | −0.4542 × 10⁻³ | 0.2227 × 10⁻⁵ | −0.3542 × 10⁻⁶ |
| 9 | 0.000 | −0.2398 × 10⁻² | 0.1160 × 10⁻³ | −0.2343 × 10⁻³ |
| 10 | −0.239 | 0.1432 × 10⁻² | 0.8329 × 10⁻³ | −0.5516 × 10⁻³ |
| 11 | 0.000 | 0.4458 × 10⁻³ | −0.6027 × 10⁻⁵ | 0.2253 × 10⁻⁶ |
| 12 | 0.000 | 0.8727 × 10⁻³ | −0.3809 × 10⁻⁵ | −0.1744 × 10⁻⁶ |

TABLE 7-continued

ASPHERICAL SURFACE DATA (aspherical surface coefficients not indicated are zero (0.00)):

| Surf. No. | A10 |
|---|---|
| 9 | 0.2901 × 10⁻⁴ |
| 10 | 0.8107 × 10⁻⁴ |
| 11 | 0.1185 × 10⁻⁷ |
| 12 | 0.2343 × 10⁻⁷ |

TABLE 8

ZOOM LENS GROUP DATA

| Lens Group | First Surface | Focal Length |
|---|---|---|
| 1 | 1 | −13.30 |
| 2 | 6 | 9.53 |
| 3 | 11 | 14.63 |

Embodiment 3

Figure 13:
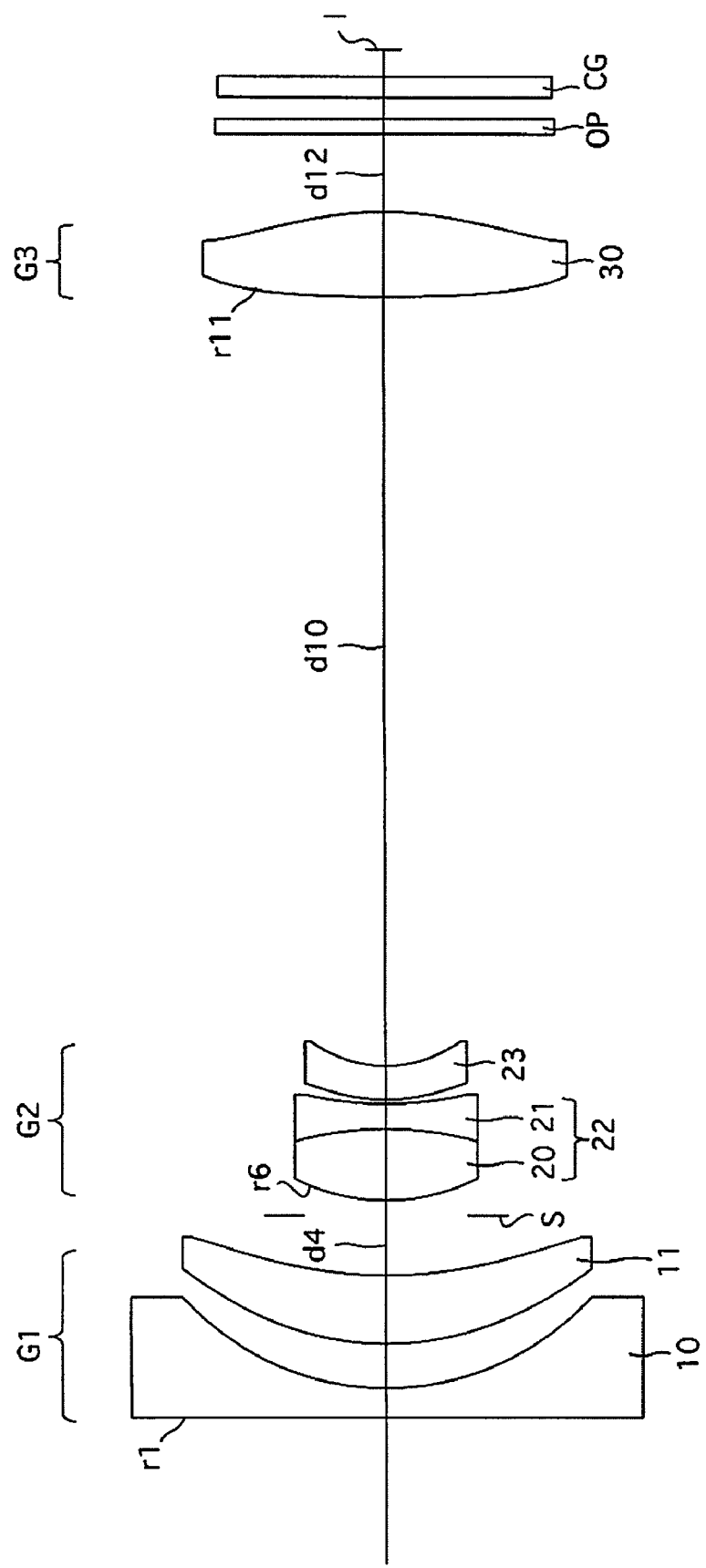
FIG. 13 shows a lens arrangement of a third numerical embodiment of the zoom lens system, according to the present invention, at the long focal length extremity when focused on an object at infinity.
Figure 14A:
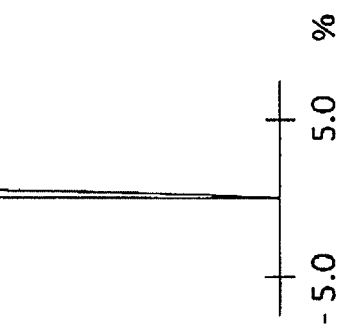
FIGS. 14A, 14B, 14C and 14D show various aberrations that occurred in the lens arrangement shown in FIG. 13.
Figure 14B:
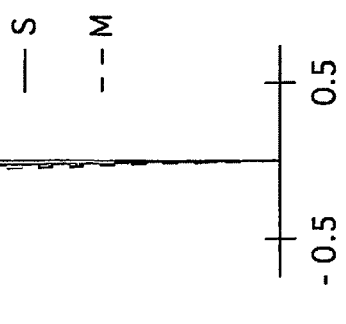
Figure 14C:
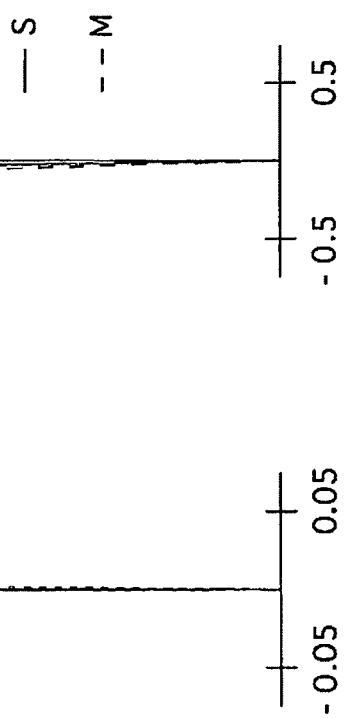
Figure 14D:
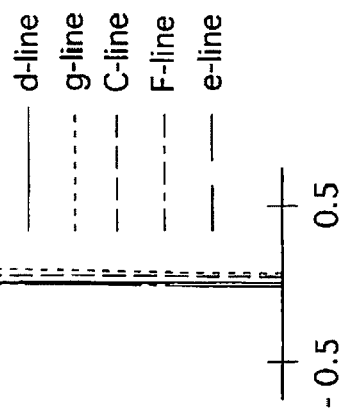
Figure 17:
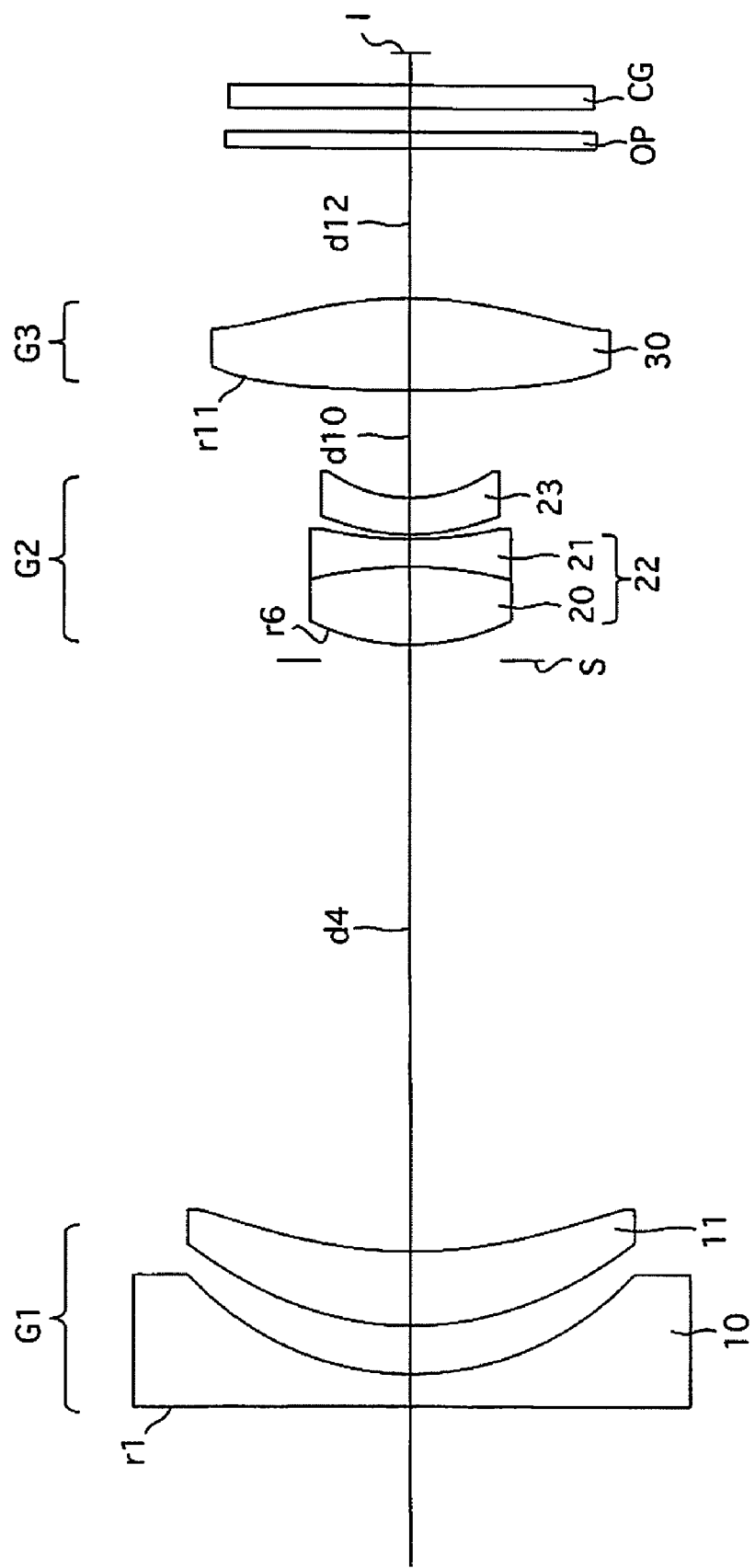
FIG. 17 shows a lens arrangement of the third numerical embodiment of the zoom lens system at the short focal length extremity when focused on an object at infinity.

FIGS. 13 through 18D and Tables 9 through 12 show a third numerical embodiment of a zoom lens system according to the present invention. FIG. 13 shows a lens arrangement of the third numerical embodiment of the zoom lens system at the long focal length extremity when focused on an object at infinity. FIGS. 14A, 14B, 14C and 14D show various aberrations that occurred in the lens arrangement shown in FIG. 13. FIG. 15 shows a lens arrangement of the third numerical embodiment of the zoom lens system at an intermediate focal length when focused on an object at infinity. FIGS. 16A, 16B, 16C and 16D show various aberrations that occurred in the lens arrangement shown in FIG. 15. FIG. 17 shows a lens arrangement of the third numerical embodiment of the zoom lens system at the short focal length extremity when focused on an object at infinity. FIGS. 18A, 18B, 18C and 18D show various aberrations that occurred in the lens arrangement shown in FIG. 17. Table 9 shows the lens surface data, Table 10 shows various zoom lens system data, Table 11 shows the aspherical surface data, and Table 12 shows the zoom lens group data of the third numerical embodiment.

The lens arrangement of the third numerical embodiment is the same as that of first numerical embodiment.

TABLE 9

LENS SURFACE DATA

| Surf. No. | r | d | Nd | νd |
|---|---|---|---|---|
| 1 | −2919.593 | 0.700 | 1.75500 | 52.3 |
| 2 | 6.625 | 1.045 | | |
| 3* | 7.085 | 1.619 | 1.82115 | 24.1 |
| 4* | 10.332 | d4 | | |
| 5 (Diaphragm) | ∞ | 0.350 | | |
| 6 | 4.872 | 1.700 | 1.88300 | 40.8 |
| 7 | −8.546 | 0.600 | 1.75211 | 25.0 |
| 8 | 8.546 | 0.100 | | |
| 9* | 4.250 | 0.800 | 1.60641 | 27.2 |
| 10* | 2.997 | d10 | | |
| 11* | 49.434 | 2.000 | 1.54358 | 55.7 |
| 12* | −8.455 | d12 | | |
| 13 | ∞ | 0.350 | 1.51680 | 64.2 |
| 14 | ∞ | 0.510 | | |
| 15 | ∞ | 0.500 | 1.51680 | 64.2 |
| 16 | ∞ | — | | |

The asterisk (*) designates an aspherical surface which is rotationally symmetrical with respect to the optical axis.

TABLE 10

ZOOM LENS SYSTEM DATA
Zoom Ratio 3.86

Short Focal Length Extremity

| | |
|---|---|
| Fno. | 3.3 |
| f | 5.00 |
| W | 43.1 |
| Y | 3.88 |
| fB | 0.59 |
| L | 29.49 |
| d4 | 12.850 |
| d10 | 2.350 |
| d12 | 3.245 |

Intermediate Focal Length

| | |
|---|---|
| Fno. | 4.8 |
| f | 9.80 |
| W | 21.7 |
| Y | 3.88 |
| fB | 0.59 |
| L | 27.78 |
| d4 | 5.662 |
| d10 | 8.669 |
| d12 | 2.410 |

Long Focal Length Extremity

| | |
|---|---|
| Fno. | 6.0 |
| f | 19.30 |
| W | 11.4 |
| Y | 3.88 |
| fB | 0.59 |
| L | 32.60 |
| d4 | 1.420 |
| d10 | 18.287 |
| d12 | 1.850 |

TABLE 11

ASPHERICAL SURFACE DATA (aspherical surface coefficients not indicated are zero (0.00)):

| Surf. No. | K | A4 | A6 | A8 |
|---|---|---|---|---|
| 3 | 0.000 | $-0.1076 \times 10^{-3}$ | $-0.6232 \times 10^{-5}$ | $-0.8841 \times 10^{-7}$ |
| 4 | 0.000 | $-0.2139 \times 10^{-3}$ | $-0.1020 \times 10^{-4}$ | $0.3974 \times 10^{-7}$ |
| 9 | 0.000 | $-0.3294 \times 10^{-2}$ | $-0.1463 \times 10^{-5}$ | $-0.1853 \times 10^{-3}$ |
| 10 | $-0.381$ | $0.8360 \times 10^{-3}$ | $0.1535 \times 10^{-3}$ | $-0.2285 \times 10^{-3}$ |
| 11 | 0.000 | $0.8275 \times 10^{-3}$ | $-0.2782 \times 10^{-4}$ | $0.1565 \times 10^{-5}$ |
| 12 | 0.000 | $0.1649 \times 10^{-2}$ | $-0.5186 \times 10^{-4}$ | $0.1982 \times 10^{-5}$ |

| Surf. No. | A10 |
|---|---|
| 9 | $0.2184 \times 10^{-4}$ |
| 10 | $0.3312 \times 10^{-4}$ |
| 11 | $0.1235 \times 10^{-8}$ |
| 12 | $0.1015 \times 10^{-7}$ |

TABLE 12

ZOOM LENS GROUP DATA

| Lens Group | First Surface | Focal Length |
|---|---|---|
| 1 | 1 | −13.82 |
| 2 | 6 | 9.55 |
| 3 | 11 | 13.45 |

Embodiment 4

Figure 21:
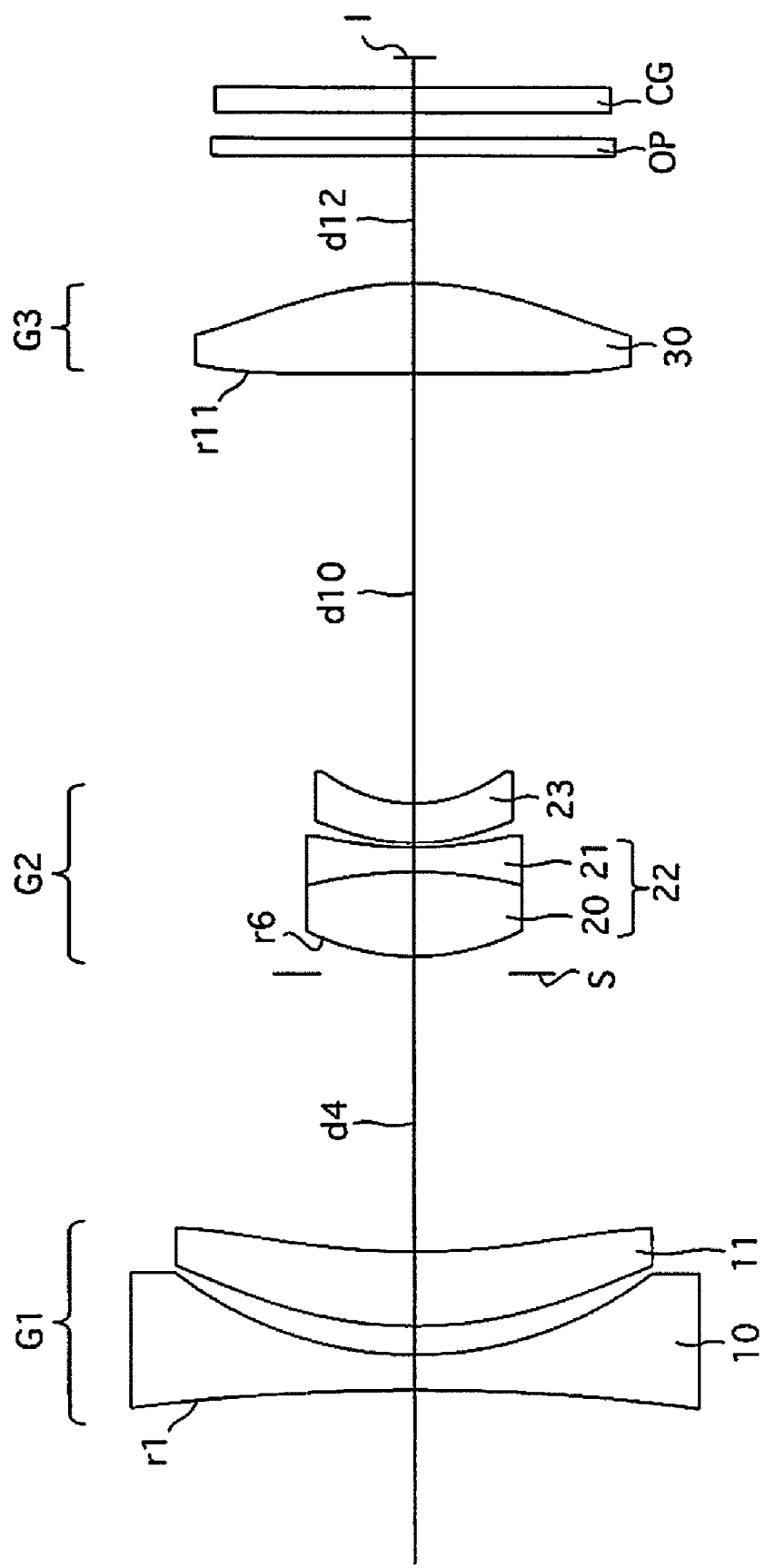
FIG. 21 shows a lens arrangement of the fourth numerical embodiment of the zoom lens system at an intermediate focal length when focused on an object at infinity.
Figure 22:
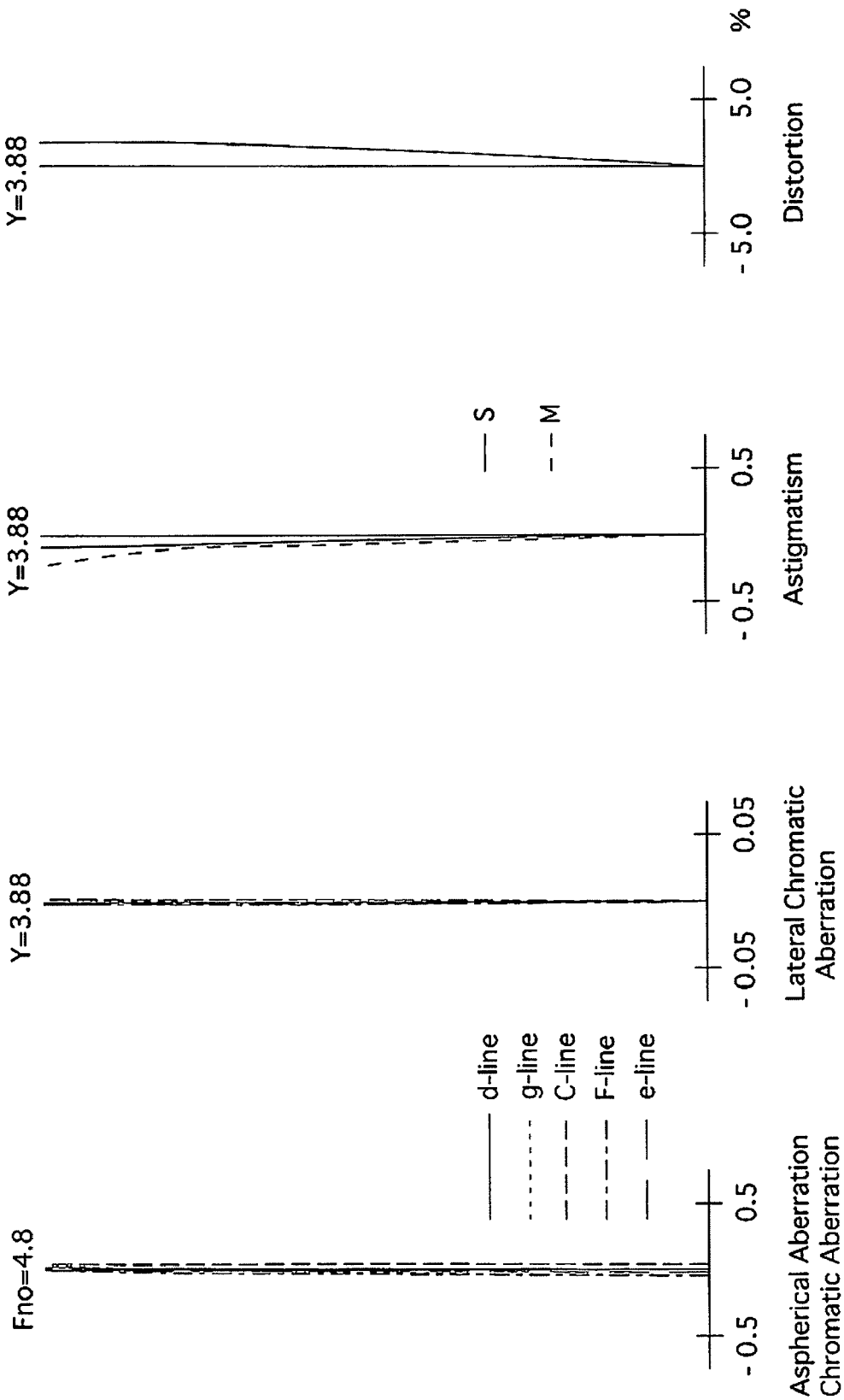
FIGS. 22A, 22B, 22C and 22D show various aberrations that occurred in the lens arrangement shown in FIG. 21.
Figure 23:
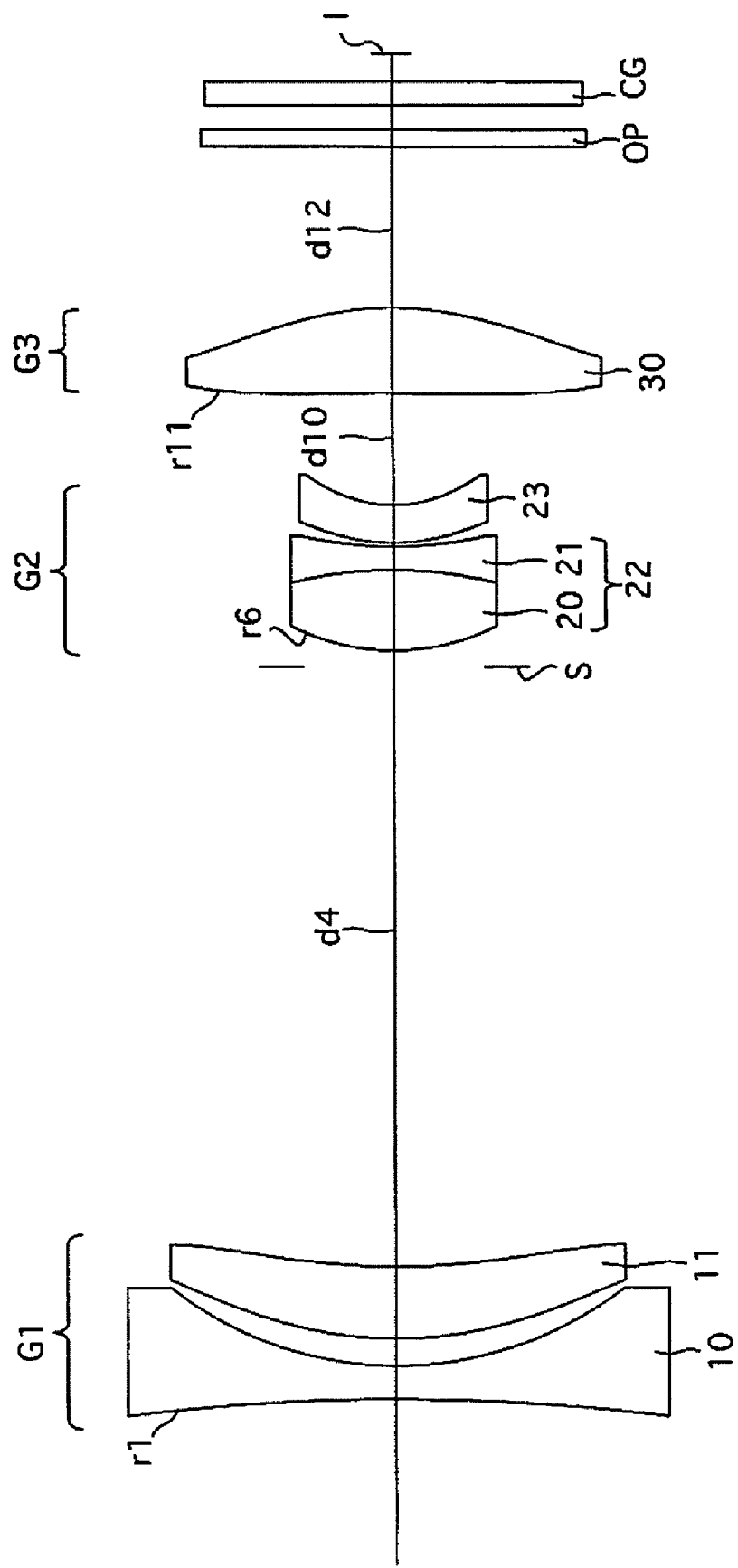
FIG. 23 shows a lens arrangement of the fourth numerical embodiment of the zoom lens system at the short focal length extremity when focused on an object at infinity.
Figure 24:
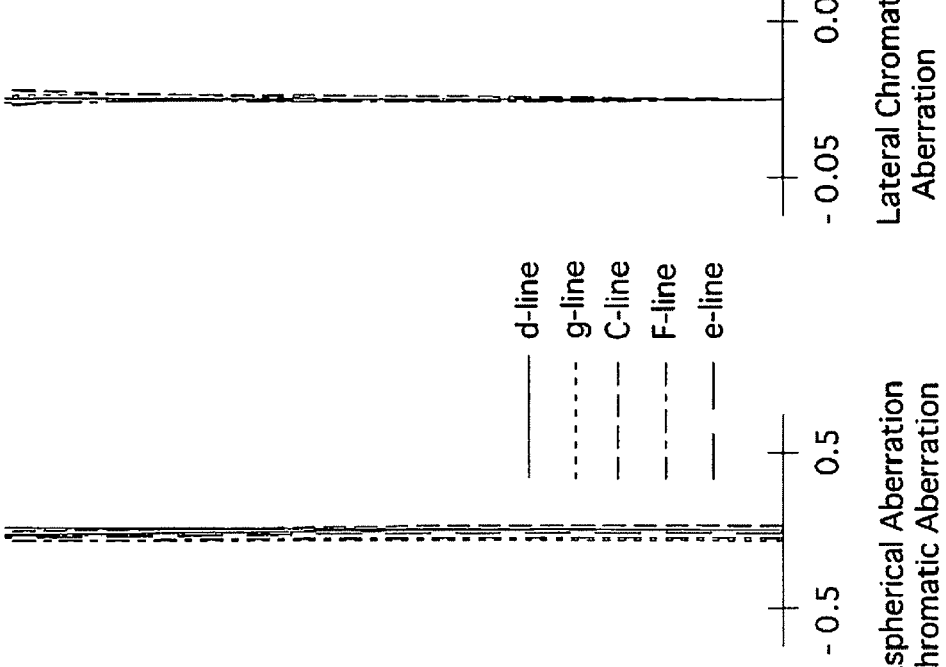
FIGS. 24A, 24B, 24C and 24D show various aberrations that occurred in the lens arrangement shown in FIG. 23.

FIGS. 19 through 24D and Tables 13 through 16 show a fourth numerical embodiment of a zoom lens system according to the present invention. FIG. 19 shows a lens arrangement of the fourth numerical embodiment of the zoom lens system at the long focal length extremity when focused on an object at infinity. FIGS. 20A, 20B, 20C and 20D show various aberrations that occurred in the lens arrangement shown in FIG. 19. FIG. 21 shows a lens arrangement of the fourth numerical embodiment of the zoom lens system at an intermediate focal length when focused on an object at infinity. FIGS. 22A, 22B, 22C and 22D show various aberrations that occurred in the lens arrangement shown in FIG. 21. FIG. 23 shows a lens arrangement of the fourth numerical embodiment of the zoom lens system at the short focal length extremity when focused on an object at infinity. FIGS. 24A, 24B, 24C and 24D show various aberrations that occurred in the lens arrangement shown in FIG. 23. Table 13 shows the lens surface data, Table 14 shows various zoom lens system data, Table 15 shows the aspherical surface data, and Table 16 shows the zoom lens group data of the fourth numerical embodiment.

The lens arrangement of the fourth numerical embodiment is the same as that of first numerical embodiment, except for the positive lens element 30 of the third lens group G3 being a positive meniscus lens element having a convex surface on the image side.

TABLE 13

LENS SURFACE DATA

| Surf. No. | r | d | Nd | νd |
|---|---|---|---|---|
| 1 | −45.963 | 0.700 | 1.75500 | 52.3 |
| 2 | 7.911 | 0.570 | | |
| 3* | 8.720 | 1.498 | 1.82115 | 24.1 |
| 4* | 15.035 | d4 | | |
| 5 (Diaphragm) | ∞ | 0.350 | | |
| 6 | 4.904 | 1.700 | 1.88300 | 40.8 |
| 7 | −8.982 | 0.500 | 1.75211 | 25.0 |
| 8 | 8.982 | 0.070 | | |
| 9* | 3.990 | 0.800 | 1.60641 | 27.2 |
| 10* | 2.839 | d10 | | |
| 11* | −101.466 | 1.800 | 1.54358 | 55.7 |
| 12* | −6.432 | d12 | | |
| 13 | ∞ | 0.350 | 1.51680 | 64.2 |
| 14 | ∞ | 0.510 | | |
| 15 | ∞ | 0.500 | 1.51680 | 64.2 |
| 16 | ∞ | — | | |

The asterisk (*) designates an aspherical surface which is rotationally symmetrical with respect to the optical axis.

TABLE 14

ZOOM LENS SYSTEM DATA
Zoom Ratio 3.86

Short Focal Length Extremity

| | |
|---|---|
| Fno. | 3.3 |
| f | 5.00 |
| W | 43.3 |
| Y | 3.88 |
| fB | 0.59 |
| L | 28.50 |
| d4 | 12.663 |
| d10 | 2.350 |
| d12 | 3.369 |

Intermediate Focal Length

| | |
|---|---|
| Fno. | 4.8 |
| f | 9.80 |
| W | 21.2 |
| Y | 3.88 |
| fB | 0.59 |
| L | 26.89 |
| d4 | 5.579 |

TABLE 14-continued

ZOOM LENS SYSTEM DATA
Zoom Ratio 3.86

| | |
|---|---|
| d10 | 8.650 |
| d12 | 2.540 |

Long Focal Length Extremity

| | |
|---|---|
| Fno. | 6.0 |
| f | 19.30 |
| W | 11.2 |
| Y | 3.88 |
| fB | 0.59 |
| L | 31.50 |
| d4 | 1.420 |
| d10 | 18.117 |
| d12 | 1.850 |

TABLE 15

ASPHERICAL SURFACE DATA (aspherical surface coefficients not indicated are zero (0.00)):

| Surf. No. | K | A4 | A6 | A8 |
|---|---|---|---|---|
| 3 | 0.000 | $-0.2040 \times 10^{-3}$ | $-0.4028 \times 10^{-5}$ | $-0.2337 \times 10^{-6}$ |
| 4 | 0.000 | $-0.3864 \times 10^{-3}$ | $-0.6001 \times 10^{-5}$ | $-0.1292 \times 10^{-6}$ |
| 9 | 0.000 | $-0.3673 \times 10^{-2}$ | $0.1043 \times 10^{-3}$ | $-0.2081 \times 10^{-3}$ |
| 10 | $-0.548$ | $0.9826 \times 10^{-3}$ | $0.4543 \times 10^{-3}$ | $-0.3223 \times 10^{-3}$ |
| 11 | 0.000 | $0.1041 \times 10^{-2}$ | $-0.1117 \times 10^{-3}$ | $0.8890 \times 10^{-5}$ |
| 12 | 0.000 | $0.2521 \times 10^{-2}$ | $-0.1645 \times 10^{-3}$ | $0.1133 \times 10^{-4}$ |

| Surf. No. | A10 |
|---|---|
| 9 | $0.2296 \times 10^{-4}$ |
| 10 | $0.4250 \times 10^{-4}$ |
| 11 | $-0.2075 \times 10^{-6}$ |
| 12 | $-0.2429 \times 10^{-6}$ |

TABLE 16

ZOOM LENS GROUP DATA

| Lens Group | First Surface | Focal Length |
|---|---|---|
| 1 | 1 | $-14.15$ |
| 2 | 6 | 9.52 |
| 3 | 11 | 12.55 |

Embodiment 5

Figure 25:
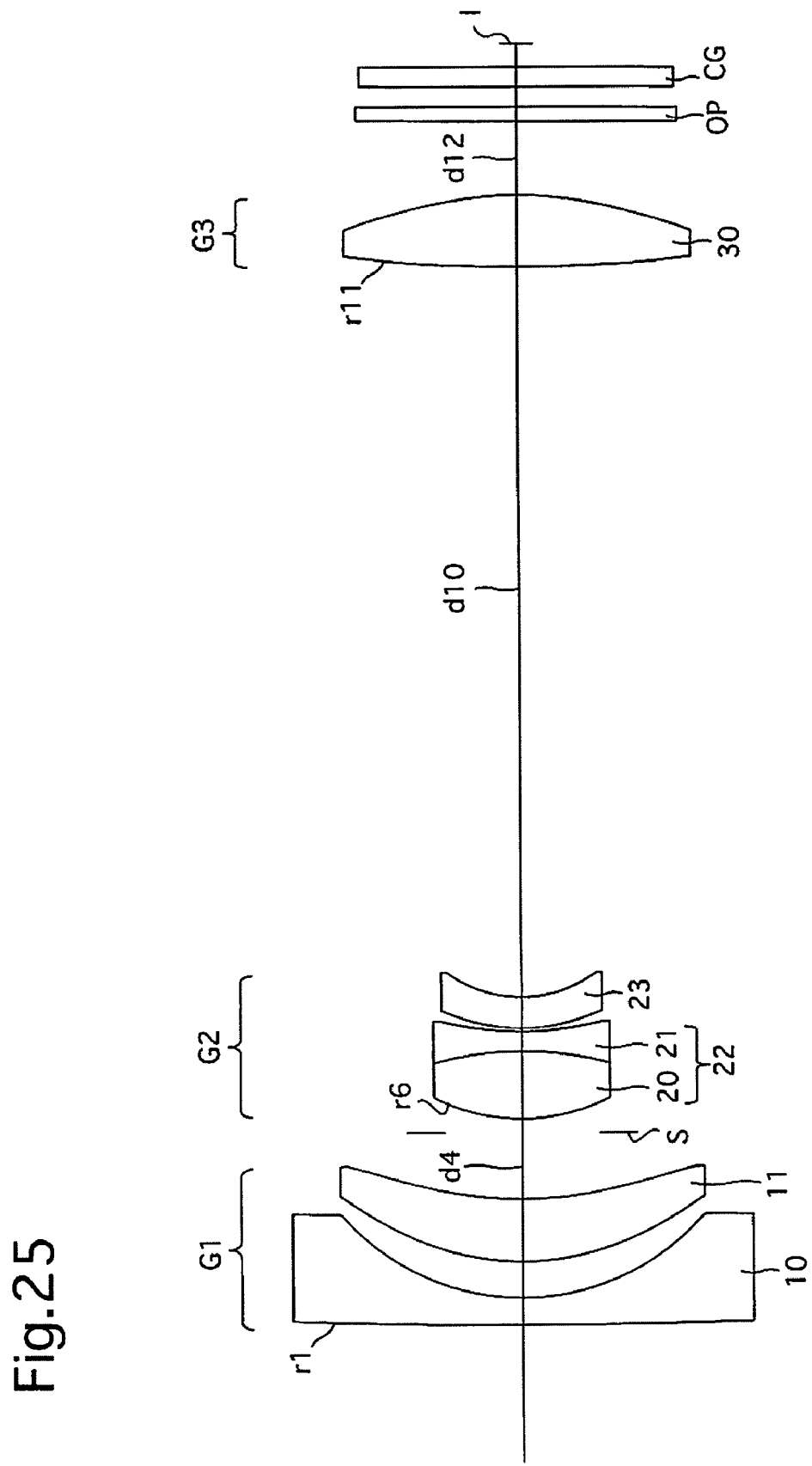
FIG. 25 shows a lens arrangement of a fifth numerical embodiment of the zoom lens system, according to the present invention, at the long focal length extremity when focused on an object at infinity.
Figure 27:
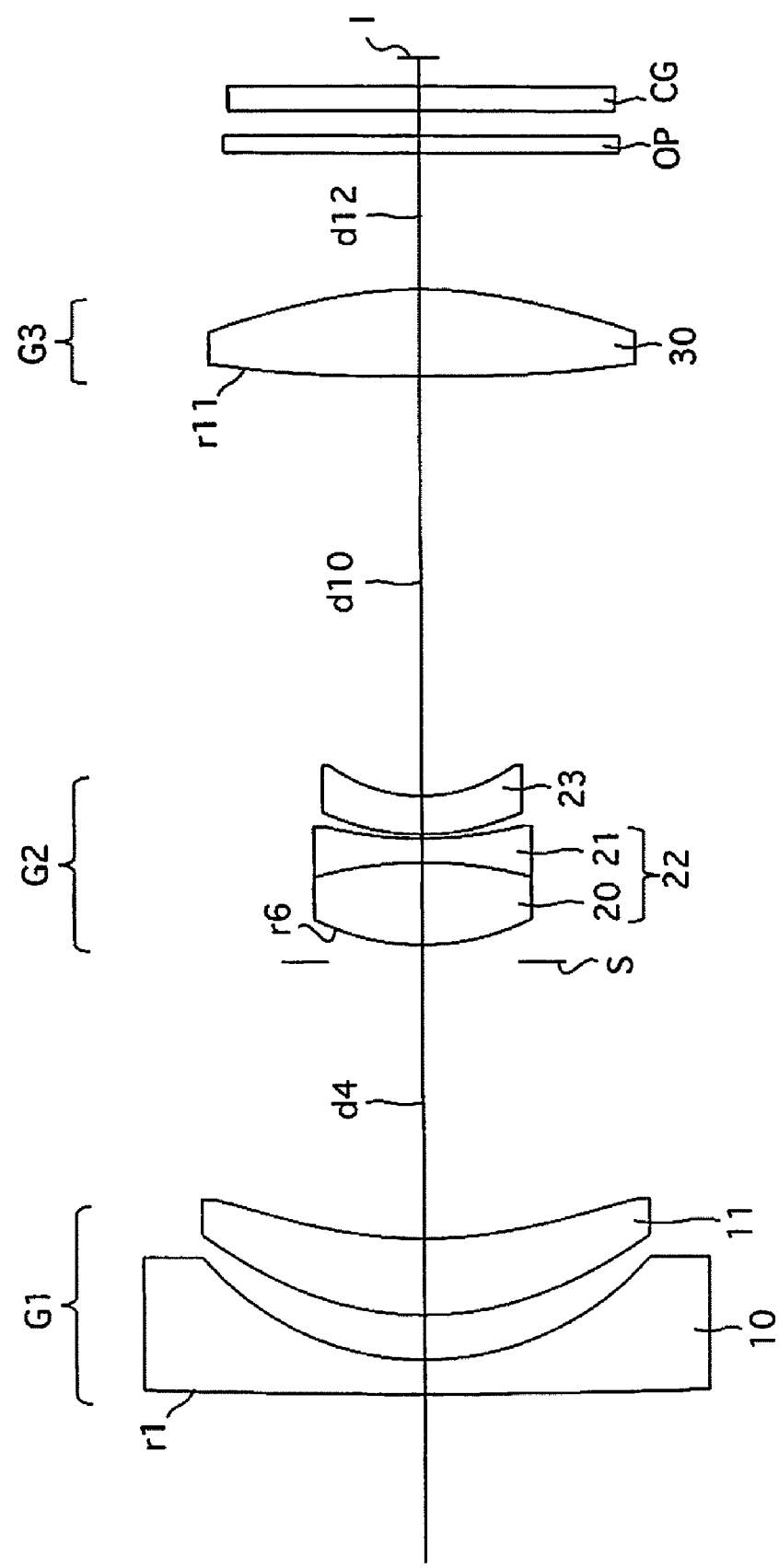
FIG. 27 shows a lens arrangement of the fifth numerical embodiment of the zoom lens system at an intermediate focal length when focused on an object at infinity.
Figure 28:
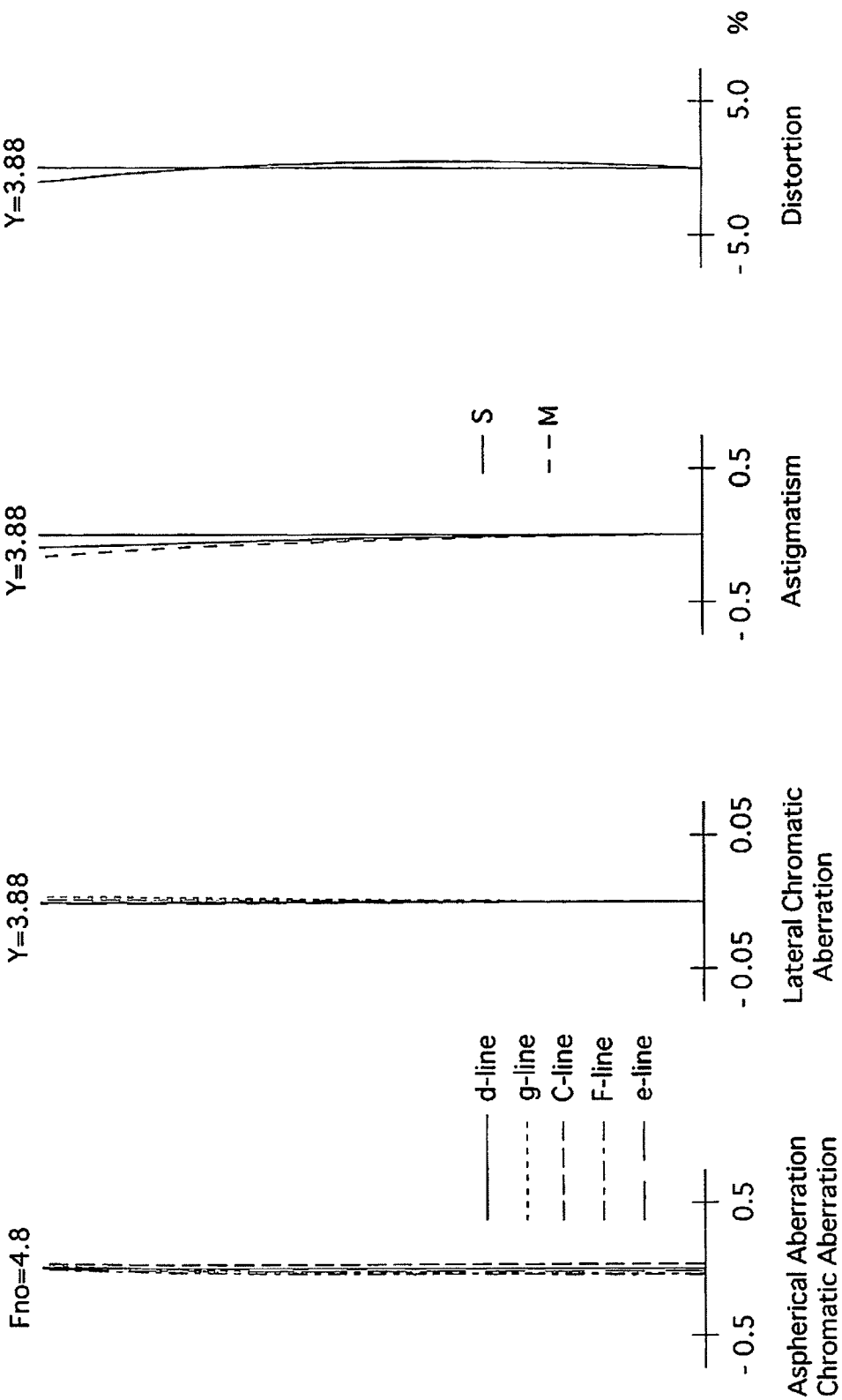
FIGS. 28A, 28B, 28C and 28D show various aberrations that occurred in the lens arrangement shown in FIG. 27.
Figure 29:
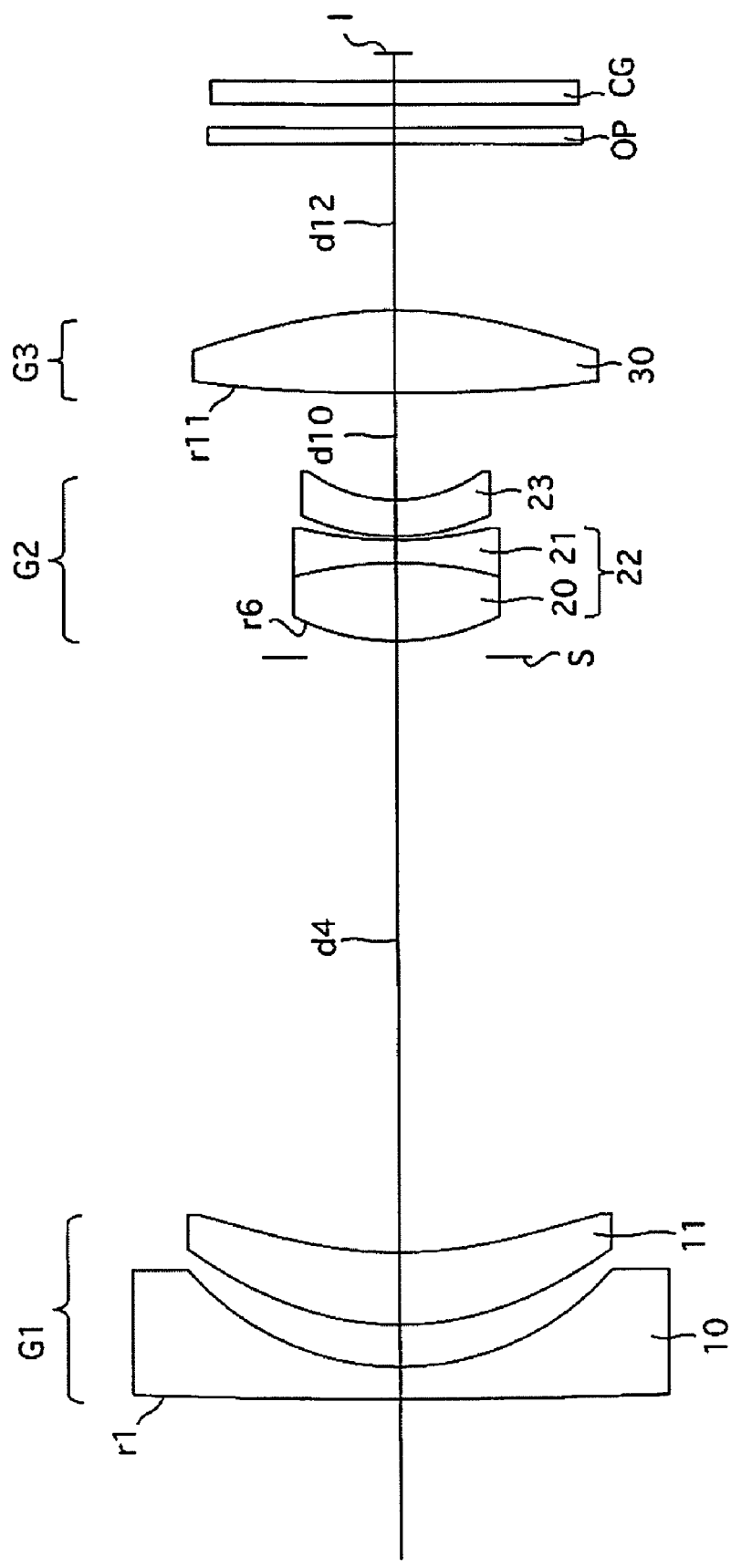
FIG. 29 shows a lens arrangement of the fifth numerical embodiment of the zoom lens system at the short focal length extremity when focused on an object at infinity.
Figure 30:
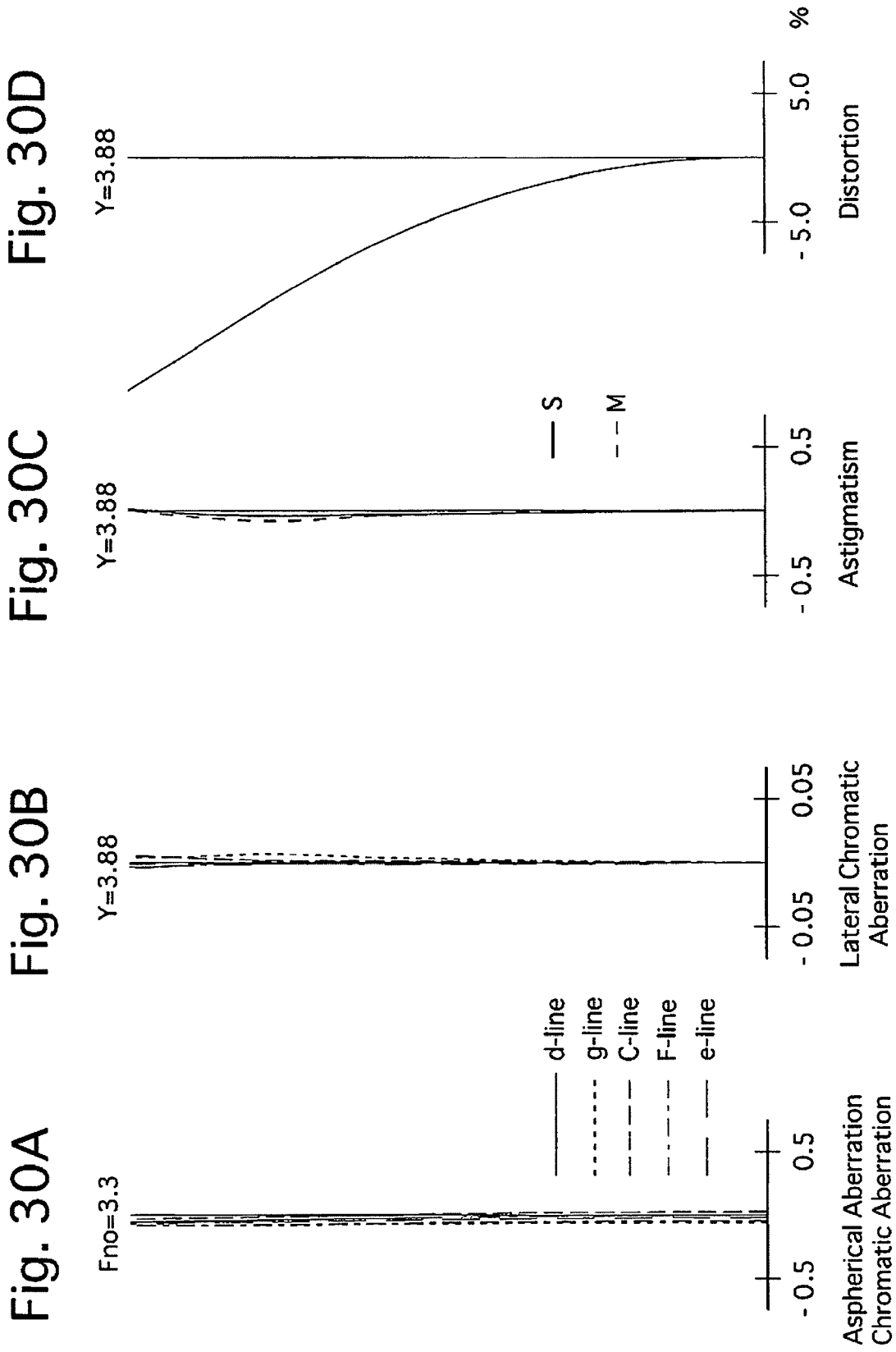
FIGS. 30A, 30B, 30C and 30D show various aberrations that occurred in the lens arrangement shown in FIG. 29.

FIGS. 25 through 30D and Tables 17 through 20 show a fifth numerical embodiment of a zoom lens system according to the present invention. FIG. 25 shows a lens arrangement of the fifth numerical embodiment of the zoom lens system at the long focal length extremity when focused on an object at infinity. FIGS. 26A, 26B, 26C and 26D show various aberrations that occurred in the lens arrangement shown in FIG. 25. FIG. 27 shows a lens arrangement of the fifth numerical embodiment of the zoom lens system at an intermediate focal length when focused on an object at infinity. FIGS. 28A, 28B, 28C and 28D show various aberrations that occurred in the lens arrangement shown in FIG. 27. FIG. 29 shows a lens arrangement of the fifth numerical embodiment of the zoom lens system at the short focal length extremity when focused on an object at infinity. FIGS. 30A, 30B, 30C and 30D show various aberrations that occurred in the lens arrangement shown in FIG. 29. Table 17 shows the lens surface data, Table 18 shows various zoom lens system data, Table 19 shows the aspherical surface data, and Table 20 shows the zoom lens group data of the fifth numerical embodiment.

The lens arrangement of the fifth numerical embodiment is the same as that of first numerical embodiment, except for the negative lens element 10 of the first lens group G1 being a negative meniscus lens element having a convex surface on the object side.

TABLE 17

LENS SURFACE DATA

| Surf. No. | r | d | Nd | vd |
|---|---|---|---|---|
| 1 | 176.511 | 0.700 | 1.75500 | 52.3 |
| 2 | 6.156 | 0.913 | | |
| 3* | 6.632 | 1.576 | 1.82115 | 24.1 |
| 4* | 9.686 | d4 | | |
| 5 (Diaphragm) | ∞ | 0.350 | | |
| 6 | 4.985 | 1.700 | 1.88300 | 40.8 |
| 7 | $-8.567$ | 0.500 | 1.75211 | 25.0 |
| 8 | 8.567 | 0.070 | | |
| 9* | 4.425 | 0.800 | 1.60641 | 27.2 |
| 10* | 3.280 | d10 | | |
| 11* | 83.400 | 1.800 | 1.54358 | 55.7 |
| 12* | $-8.621$ | d12 | | |
| 13 | ∞ | 0.350 | 1.51680 | 64.2 |
| 14 | ∞ | 0.510 | | |
| 15 | ∞ | 0.500 | 1.51680 | 64.2 |
| 16 | ∞ | — | | |

The asterisk (*) designates an aspherical surface which is rotationally symmetrical with respect to the optical axis.

TABLE 18

ZOOM LENS SYSTEM DATA
Zoom Ratio 3.86

Short Focal Length Extremity

| | |
|---|---|
| Fno. | 3.3 |
| f | 5.00 |
| W | 43.4 |
| Y | 3.88 |
| fB | 0.59 |
| L | 29.41 |
| d4 | 12.948 |
| d10 | 2.323 |
| d12 | 3.601 |

Intermediate Focal Length

| | |
|---|---|
| Fno. | 4.8 |
| f | 9.80 |
| W | 21.8 |
| Y | 3.88 |
| fB | 0.59 |
| L | 27.69 |
| d4 | 5.691 |
| d10 | 8.665 |
| d12 | 2.799 |

Long Focal Length Extremity

| | |
|---|---|
| Fno. | 6.0 |
| f | 19.30 |
| W | 11.4 |
| Y | 3.88 |
| fB | 0.59 |
| L | 32.60 |
| d4 | 1.675 |
| d10 | 18.538 |
| d12 | 1.850 |

TABLE 19

ASPHERICAL SURFACE DATA (aspherical surface coefficients not indicated are zero (0.00)):

| Surf. No. | K | A4 | A6 | A8 |
|---|---|---|---|---|
| 3 | 0.000 | $-0.2554 \times 10^{-3}$ | $-0.7500 \times 10^{-5}$ | $-0.2070 \times 10^{-6}$ |
| 4 | 0.000 | $-0.4088 \times 10^{-3}$ | $-0.1083 \times 10^{-4}$ | $-0.4987 \times 10^{-7}$ |
| 9 | 0.000 | $-0.1166 \times 10^{-2}$ | $-0.9432 \times 10^{-4}$ | $-0.1066 \times 10^{-3}$ |
| 10 | $-0.289$ | $0.2919 \times 10^{-2}$ | $0.2129 \times 10^{-3}$ | $-0.1739 \times 10^{-3}$ |
| 11 | 0.000 | $0.9789 \times 10^{-3}$ | $-0.9349 \times 10^{-4}$ | $0.6129 \times 10^{-5}$ |
| 12 | 0.000 | $0.1798 \times 10^{-2}$ | $-0.1291 \times 10^{-3}$ | $0.7412 \times 10^{-5}$ |

| Surf. No. | A10 |
|---|---|
| 9 | $0.9646 \times 10^{-5}$ |
| 10 | $0.1663 \times 10^{-4}$ |
| 11 | $-0.1515 \times 10^{-6}$ |
| 12 | $-0.1678 \times 10^{-6}$ |

TABLE 20

ZOOM LENS GROUP DATA

| Lens Group | First Surface | Focal Length |
|---|---|---|
| 1 | 1 | $-13.59$ |
| 2 | 6 | 9.55 |
| 3 | 11 | 14.47 |

The numerical values of each condition for each embodiment are shown in Table 21.

TABLE 21

|  | Embod. 1 | Embod. 2 | Embod. 3 |
|---|---|---|---|
| Condition (1) | 2.961 | 2.961 | 2.961 |
| Condition (2) | 0.900 | 0.902 | 0.938 |
| Condition (3) | 3.005 | 2.996 | 3.186 |

|  | Embod. 4 | Embod. 5 |
|---|---|---|
| Condition (1) | 2.913 | 2.920 |
| Condition (2) | 0.964 | 0.916 |
| Condition (3) | 3.353 | 2.911 |

As can be understood from Table 21, the first through fifth numerical embodiments satisfy conditions (1) through (3). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a negative first lens group, a positive second lens group, and a positive third lens group, in that order from the object side,
wherein upon zooming from the short focal length extremity to the long focal length extremity, each of the first through third lens groups move along the optical axis,
wherein said second lens group comprises a positive lens element, a negative lens element and a negative lens element, in that order from the object side, and wherein the following conditions (1) and (2) are satisfied:

$$2.0 < |VD1t - VD1w|/(ft/fw) < 3.4 \quad (1),$$

and $$0.89 < |m2w/m3w| \quad (2),$$

wherein
VD1t designates the distance along the optical axis, at the long focal length extremity, from the surface on the image side of the lens element provided closest to the image side within said first lens group to the surface on the object side of the positive lens element provided closest to the object side within said second lens group;
VD1w designates the distance along the optical axis, at the short focal length extremity, from the surface on the image side of the lens element provided closest to the image side within said first lens group to the surface on the object side of the positive lens element provided closest to the object side within said second lens group;
ft designates the focal length of the entire said zoom lens system at the long focal length extremity;
fw designates the focal length of the entire said zoom lens system at the short focal length extremity;
m2w designates the lateral magnification of said second lens group at the short focal length extremity when focused on an object at infinity; and
m3w designates the lateral magnification of said third lens group at the short focal length extremity when focused on an object at infinity.

2. The zoom lens system according to claim 1, wherein the following condition (3) is satisfied:

$$2.8 < f2/rb < 4.0 \quad (3), \text{ wherein}$$

f2 designates the combined focal length of said second lens group; and
rb designates the radius of curvature of the surface on the image side of the negative lens element provided closest to the image side within said second lens group.

3. The zoom lens system according to claim 1, wherein the positive lens element and the negative lens element, which is provided on the object side within said second lens group, are bonded to each other to constitute a cemented lens.

4. The zoom lens system according to claim 1, wherein the negative lens element provided on the image side within said second lens group comprises a resin lens element provided with aspherical surfaces on both sides thereof.

5. The zoom lens system according to claim 1, wherein said third lens group comprises one positive lens element that constitutes a focusing lens group that is moved along the optical axis thereof during a focusing operation, and wherein said one positive lens element is provided with at least one aspherical surface.

* * * * *